US012578476B2

(12) United States Patent
Angus

(10) Patent No.: US 12,578,476 B2
(45) **Date of Patent: *Mar. 17, 2026**

(54) METHOD AND SYSTEM FOR REFRACTIVE BEAM-STEERING

(71) Applicant: Aurora Operations, Inc., Pittsburgh, PA (US)

(72) Inventor: Edward Joseph Angus, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/229,828

(22) Filed: Jun. 5, 2025

(65) Prior Publication Data

US 2025/0298143 A1     Sep. 25, 2025

Related U.S. Application Data

(63) Continuation of application No. 18/499,734, filed on Nov. 1, 2023, now Pat. No. 12,360,248, which is a (Continued)

(51) Int. Cl.
| | |
|---|---|
| *G01C 3/00* | (2006.01) |
| *G01S 7/481* | (2006.01) |

(Continued)

(52) U.S. Cl.
CPC .......... *G01S 17/931* (2020.01); *G01S 7/4817* (2013.01); *G02F 1/292* (2013.01); *G02B 26/103* (2013.01)

(58) Field of Classification Search
CPC ...... G01S 17/931; G01S 7/4817; G02F 1/292; G02B 26/103
See application file for complete search history.

(56) References Cited

U.S. PATENT DOCUMENTS

| | | | |
|---|---|---|---|
| 5,363,387 A | 11/1994 | Sinofsky | |
| 9,097,800 B1 | 8/2015 | Zhu | |

(Continued)

FOREIGN PATENT DOCUMENTS

| | | |
|---|---|---|
| EP | 1986032 A1 | 10/2008 |
| EP | 3497926 B1 | 9/2021 |

(Continued)

OTHER PUBLICATIONS

Canadian Office Action issued in connection with CA Appl. Ser. No. 3125683 dated Sep. 28, 2022.

(Continued)

*Primary Examiner* — Mark Hellner
(74) *Attorney, Agent, or Firm* — Dority & Manning, P.A.

(57) ABSTRACT

A light detection and ranging (LIDAR) system for a vehicle, includes a first scanner that receives a beam transmitted along an optical axis and projects the beam, a second scanner that is positioned along the optical axis, one or more motors that are coupled to the first scanner and the second scanner, and one or more processors. The one or more processors are configured to generate, based on one or more components of a particular waveform, a signal indicating data including a relative phase between the first scanner and the second scanner, and transmit the generated signal to the one or more motors, the signal causing the one or more motors to rotate the first scanner and the second scanner.

20 Claims, 15 Drawing Sheets

Related U.S. Application Data continuation of application No. 17/069,000, filed on Oct. 13, 2020, now Pat. No. 11,835,630, which is a continuation of application No. 16/732,181, filed on Dec. 31, 2019, now Pat. No. 10,809,381.

(60) Provisional application No. 62/788,304, filed on Jan. 4, 2019.

(51) Int. Cl.
    *G01S 17/931*     (2020.01)
    *G02F 1/29*     (2006.01)
    *G02B 26/10*     (2006.01)

(56) References Cited

U.S. PATENT DOCUMENTS

| | | | | |
|---|---|---|---|---|
| 10,809,381 | B2 * | 10/2020 | Angus | G01S 7/4816 |
| 11,835,630 | B2 * | 12/2023 | Angus | G02F 1/292 |
| 12,360,248 | B2 * | 7/2025 | Angus | G01S 7/4815 |
| 2008/0106777 | A1 | 5/2008 | Weir | |
| 2010/0027089 | A1 | 2/2010 | Nilsson | |
| 2014/0029282 | A1 | 1/2014 | Ravier et al. | |
| 2015/0247953 | A1 | 9/2015 | O'Brien | |
| 2016/0274589 | A1 | 9/2016 | Templeton et al. | |
| 2017/0082735 | A1 | 3/2017 | Slobodyanyuk et al. | |
| 2017/0299697 | A1 | 10/2017 | Swanson | |
| 2017/0307736 | A1 | 10/2017 | Donovan | |
| 2018/0047166 | A1 | 2/2018 | Viswanathan | |
| 2018/0284231 | A1 | 10/2018 | Gaalema et al. | |
| 2019/0154836 | A1 | 5/2019 | Campbell et al. | |
| 2019/0227175 | A1 | 7/2019 | Steinberg | |
| 2020/0025923 | A1 | 1/2020 | Eichenholz | |

FOREIGN PATENT DOCUMENTS

| | | |
|---|---|---|
| JP | 2017156141 | 9/2017 |
| KR | 20200016675 A | 2/2020 |
| WO | WO 2007057474 A1 | 5/2007 |
| WO | WO 2018107237 A1 | 6/2018 |
| WO | WO 2019064062 A1 | 4/2019 |

OTHER PUBLICATIONS

Corrected Notice of Allowance on U.S. Appl. No. 16/732,181 dated Aug. 25, 2020 (2 pages).

Examination Report on AU Appl. Ser. No. 2019418812 dated Jul. 13, 2021 (6 pages).

Final Office Action on U.S. Appl. No. 17/069,000 dated May 15, 2023.

First Chinese Office Action on CN Appl. Ser. No. 201980087984.2 dated Feb. 2, 2022 (18 pages).

Foreign Action other than Search Report on CA dated Sep. 28, 2023.

Foreign Action other than Search Report on CN dated Dec. 26, 2022.

Foreign Action other than Search Report on KR Appl. No. 1020247007102 dated May 8, 2024.

International Search Report and Written Opinion regarding Appl. No. PCT/US2019/069144, mail date Mar. 27, 2020, 13 pps.

International Preliminary Report on Patentability on Appl. Ser No. PCT/US2019/069144 dated Jul. 15, 2021 (7 pages).

Korean Office Action issued in connection with KR Appl. Ser. No. 10-2023-7017839 dated Jun. 21, 2023.

Non-Final Office Action on U.S. Appl. No. 17/069,000 dated Jan. 6, 2023.

Non-Final Office Action on U.S. Appl. No. 16/732,181 dated Mar. 5, 2020 (7 pages).

Notice of Allowance on U.S. Appl. No. 17/069,000 dated Aug. 2, 2023.

Notice of Allowance on U.S. Appl. No. 16/732,181 dated Jul. 21, 2020 (5 pages).

Notice of Reasons for Refusal on JP Appl. Ser. No. 2021-538999 dated Nov. 30, 2021 (14 pages).

Notice of Reasons for Refusal on JP Appl. Ser. No. 2021-538999 dated Apr. 26, 2022 (8 pages).

Second Chinese Office Action on CN Appl. Ser. No. 201980087984.2 dated Aug. 30, 2022.

Third party submission under 37 CFR 1.290 filed Jun. 25, 2020 for U.S. Appl. No. 16/728,375 (73 pages).

* cited by examiner

FIG. 1D

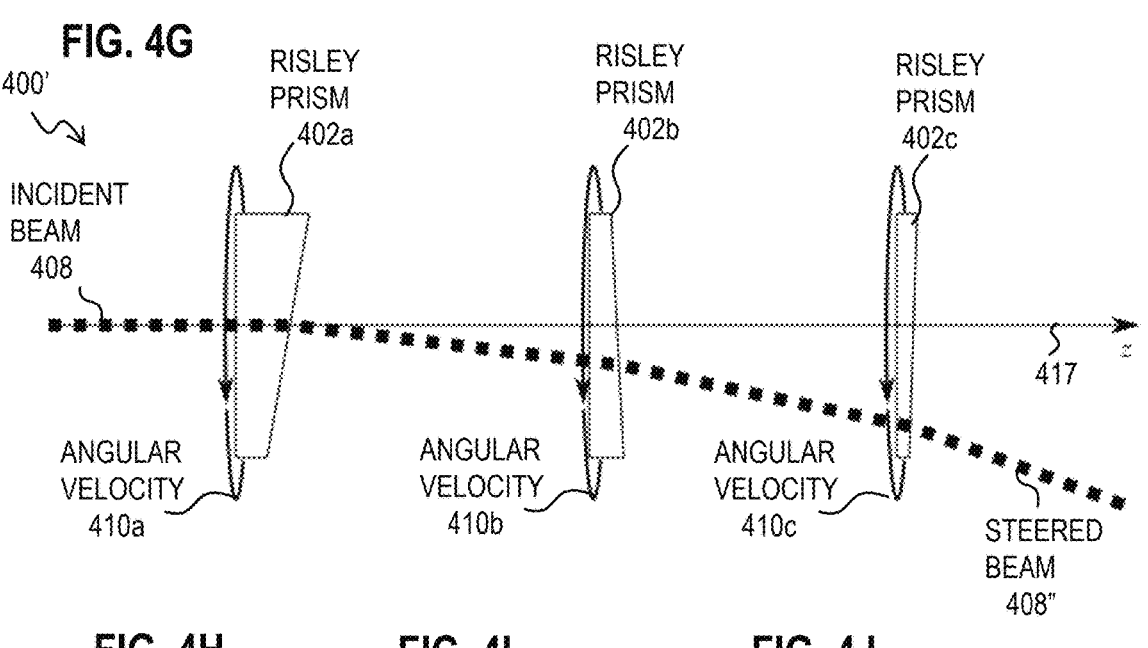
FIG. 4G
RISLEY PRISM 402a
RISLEY PRISM 402b
RISLEY PRISM 402c
400'
INCIDENT BEAM 408
ANGULAR VELOCITY 410a
ANGULAR VELOCITY 410b
ANGULAR VELOCITY 410c
STEERED BEAM 408"
417
z
FIG. 4H          FIG. 4I          FIG. 4J
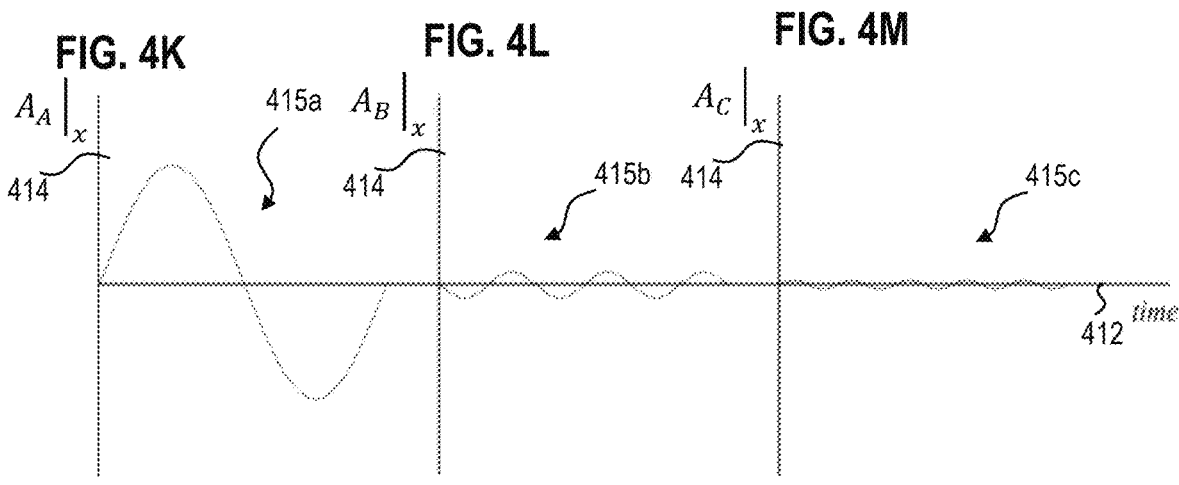
FIG. 4K          FIG. 4L          FIG. 4M

WAVEFORM
427

414

415a

415c

415b

WAVEFORM
442

440

414

TRIANGULAR
WAVEFORM
420

WAVEFORM
427

414

501

Figure 6B:
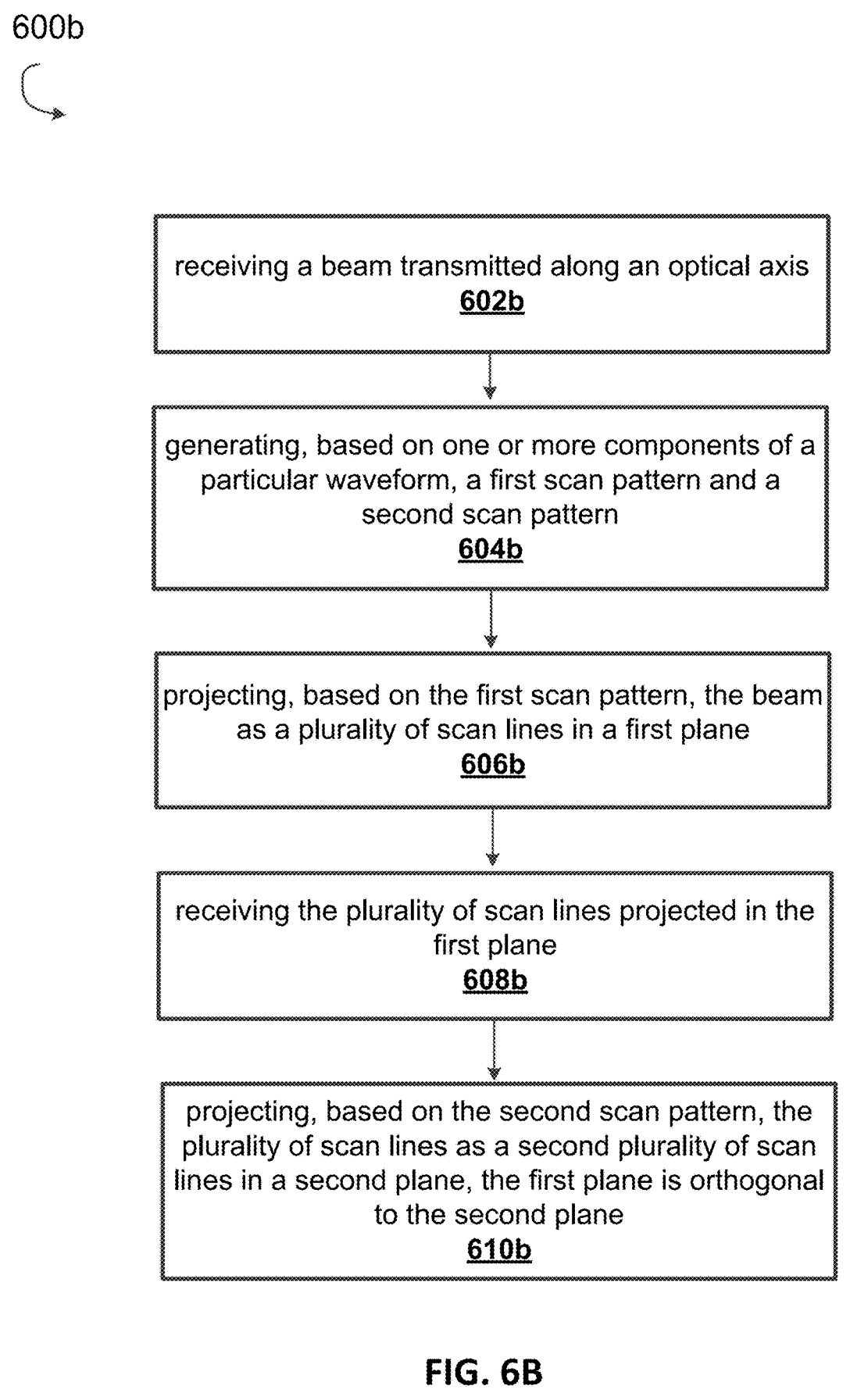

600b receiving a beam transmitted along an optical axis
602b generating, based on one or more components of a
particular waveform, a first scan pattern and a
second scan pattern
604b projecting, based on the first scan pattern, the beam
as a plurality of scan lines in a first plane
606b receiving the plurality of scan lines projected in the
first plane
608b projecting, based on the second scan pattern, the
plurality of scan lines as a second plurality of scan
lines in a second plane, the first plane is orthogonal
to the second plane
610b

METHOD AND SYSTEM FOR REFRACTIVE BEAM-STEERING

CROSS-REFERENCE TO RELATED APPLICATIONS

This application is a continuation to U.S. patent application Ser. No. 18/499,734, filed Nov. 1, 2023, which is a continuation to U.S. patent application Ser. No. 17/069,000, filed Oct. 13, 2020 (issued with U.S. Pat. No. 11,835,630 on Dec. 5, 2023), which is a continuation to U.S. patent application Ser. No. 16/732,181, filed Dec. 31, 2019 (issued with U.S. Pat. No. 10,809,381 on Oct. 20, 2020), which claims the benefit of and priority to U.S. Provisional Patent Application No. 62/788,304, filed Jan. 4, 2019. Applicant claims priority to and the benefit of each of such applications and incorporates all such applications herein by reference in its entirety.

BACKGROUND

Optical detection of range using lasers, often referenced by a mnemonic, LIDAR, for light detection and ranging, also sometimes called laser RADAR, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

SUMMARY

Aspects of the present disclosure relate generally to light detection and ranging (LIDAR) in the field of optics, and more particularly to systems and methods for refractive beam steering in a LIDAR system.

One embodiment disclosed herein is directed to an apparatus for refractive beam steering in a LIDAR system. In some embodiments, the apparatus includes a first scanner that receives a beam transmitted along an optical axis and projects the beam as a plurality of scan lines in a first plane between a first angle and a second angle. In some embodiments, first angle and second angle are defined with respect to the optical axis. In some embodiments, the apparatus includes a motor that is coupled to the first scanner (also referred to herein as, "an optical component"). In some embodiments, the system includes one or more processors that are configured to generate rotation information based on one or more components of a particular waveform. In some embodiments, the one or more processors are further configured to transmit a signal to the motor. In some embodiments, the signal causes the motor to rotate the first scanner based on the rotation information.

In another aspect, the present disclosure is directed to a method for refractive beam steering in a LIDAR system. In some embodiments, the method includes receiving a beam transmitted along an optical axis. In some embodiments, the method includes generating, based on one or more components of a particular waveform, a first scan pattern and a second scan pattern. In some embodiments, the method includes projecting, based on the first scan pattern, the beam as a plurality of scan lines in a first plane. In some embodiments, the method includes receiving the plurality of scan lines projected in the first plane. In some embodiments, the method includes projecting, based on the second scan pattern, the plurality of scan lines as a second plurality of scan lines in a second plane. In some embodiments, the first plane is orthogonal to the second plane.

In another aspect, the present disclosure is directed to a non-transitory computer-readable storage medium storing instructions which, when executed by one or more processors, cause the one or more processors to perform operations including determining a plurality of Fourier component waveforms of a triangular waveform. In some embodiments, the non-transitory computer-readable storage medium storing instructions which, when executed by one or more processors, cause the one or more processors to perform operations including determining a value of a parameter of one or more optical components based on a value of a first parameter of the plurality of Fourier component waveforms. In some embodiments, the non-transitory computer-readable storage medium storing instructions which, when executed by one or more processors, cause the one or more processors to perform operations including determining an angular frequency and relative phase of each of the one or more optical components based on a value of a second parameter of the Fourier component waveforms. In some embodiments, the non-transitory computer-readable storage medium storing instructions which, when executed by one or more processors, cause the one or more processors to perform operations including rotating the one or more optical components based on the angular frequency and relative phase of each of the one or more optical components to cause the one or more optical components to receive a beam transmitted along an optical axis and project the beam as a plurality of scan lines in a first plane between a first angle and a second angle based on the triangular waveform. In some embodiments, each of the first and second angles are with respect to the optical axis.

Still other aspects, features, and advantages are readily apparent from the following detailed description, simply by illustrating a number of particular embodiments and implementations, including the best mode contemplated for carrying out the invention. Other embodiments are also capable of other and different features and advantages, and their several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 1D is a set of graphs that illustrates an example optical chirp measurement of range, according to an embodiment;

FIG. 4G is an image that illustrates an example of sequentially arranged optical components along an optical axis that collectively steer a beam perpendicular to the optical axis based on collective rotation of the optical components, according to an embodiment;

FIG. 4H is a graph that illustrates an example of a projection of the steered beam angle of FIG. 4A in a two-dimensional plane orthogonal to the axis by a first optical component and an angular velocity vector of the first optical component, according to an embodiment;

FIG. 4I is a graph that illustrates an example of a projection of the steered beam angle of FIG. 4A in a two-dimensional plane orthogonal to the axis by a second optical component and an angular velocity vector of the second optical component, according to an embodiment;

FIG. 4J is a graph that illustrates an example of a projection of the steered beam angle of FIG. 4A in a two-dimensional plane orthogonal to the axis by a third optical component and an angular velocity vector of the third optical component, according to an embodiment;

FIG. 4K is a graph that illustrates an example of a sinusoid curve indicating a projection of the steered beam angle of FIG. 4H along the vertical axis of the two-dimensional plane over time due to rotation of the first optical component, according to an embodiment;

FIG. 4L is a graph that illustrates an example of a sinusoid curve indicating a projection of the steered beam angle of FIG. 4I along the vertical axis of the two-dimensional plane over time due to rotation of the second optical component, according to an embodiment;

FIG. 4M is a graph that illustrates an example of a sinusoid curve indicating a projection of the steered beam angle of FIG. 4J along the vertical axis of the two-dimensional plane over time due to rotation of the third optical component, according to an embodiment;

FIG. 6B is a flow chart that illustrates an example method for refractive beam steering in a LIDAR system, according to an embodiment.

DETAILED DESCRIPTION

Figure 1A:
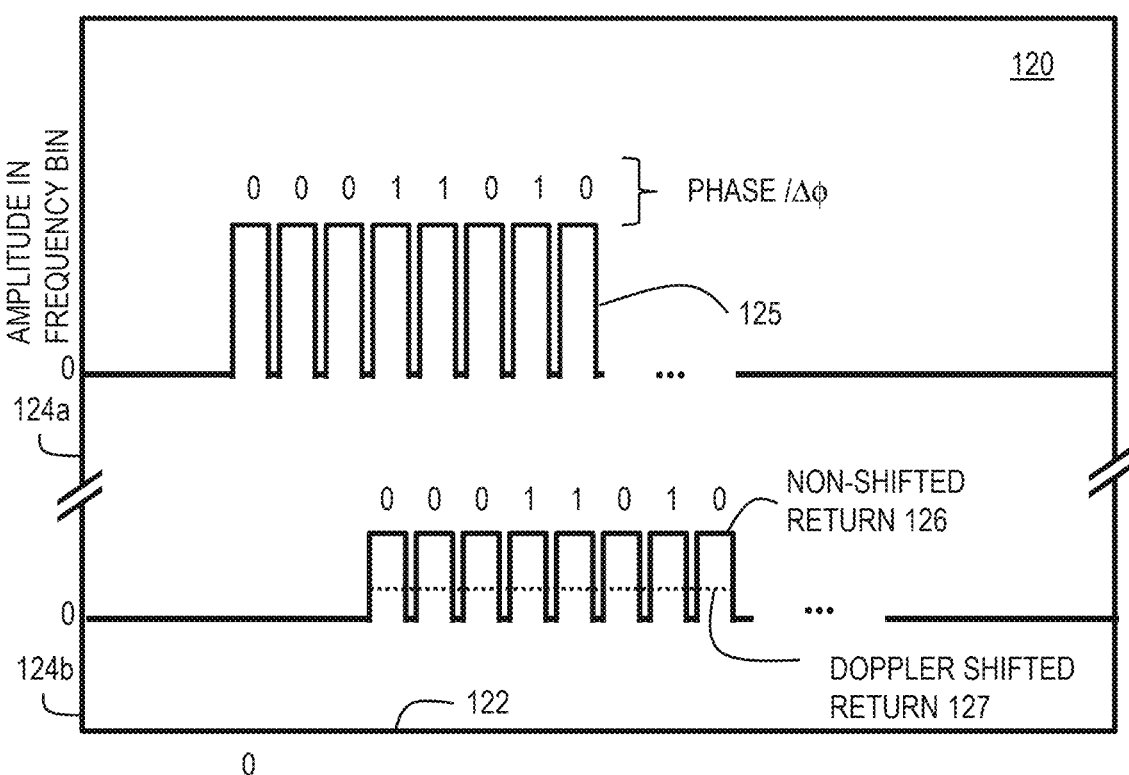
FIG. 1A is a schematic graph that illustrates the example transmitted signal of a series of binary digits along with returned optical signals for measurement of range, according to an embodiment.

To achieve acceptable range accuracy and detection sensitivity, direct long range LIDAR systems use short pulse lasers with low pulse repetition rate and extremely high pulse peak power. The high pulse power can lead to rapid degradation of optical components. Chirped and phase-encoded LIDAR systems use long optical pulses with relatively low peak optical power. In this configuration, the range accuracy increases with the chirp bandwidth or length and bandwidth of the phase codes rather than the pulse duration, and therefore excellent range accuracy can still be obtained.

Useful optical bandwidths have been achieved using wideband radio frequency (RF) electrical signals to modulate an optical carrier. Recent advances in LIDAR include using the same modulated optical carrier as a reference signal that is combined with the returned signal at an optical detector to produce in the resulting electrical signal a relatively low beat frequency in the RF band that is proportional to the difference in frequencies or phases between the references and returned optical signals. This kind of beat frequency detection of frequency differences at a detector is called heterodyne detection. It has several advantages known in the art, such as the advantage of using RF components of ready and inexpensive availability.

Recent work by the current inventors, show a novel arrangement of optical components and coherent processing to detect Doppler shifts in returned signals that provide not only improved range but also relative signed speed on a vector between the LIDAR system and each external object. These systems are called hi-res range-Doppler LIDAR herein. See for example World Intellectual Property Organization (WIPO) publications based on Patent Cooperation Treaty (PCT) patent applications PCT/US2017/062703 and PCT/US2018/016632.

These improvements provide range, with or without target speed, in a pencil thin laser beam of proper frequency or phase content. When such beams are swept over a scene, information about the location and speed of surrounding objects can be obtained. This information is expected to be of value in control systems for autonomous vehicles, such as self-driving, or driver assisted, automobiles.

Opto-mechatronic deflection of laser light is conventionally used for beam-steering in LIDAR systems. These conventional LIDAR systems on a macro scale involve the selection of reflective, refractive and diffractive elements according to their material properties to guide a spatially coherent light source in a chosen direction. These systems utilize high performance galvanometric scanners that operate under sophisticated second order electromagnetic state-systems necessitating high power data and extensive tuning.

However, the aforementioned scanners utilize scanning patterns that produce uneven spacing in the projected beam, which in turn, results in non-uniform coverage of the returned beam.

Accordingly, the present disclosure is directed to systems and methods for refractive beam steering in a LIDAR system. That is, the present disclosure describes an improved refractive beam-steering system and method that produces even or nearly even spacing in a projected beam, resulting in a uniform coverage of the returned beam. Furthermore, the disclosed method and system mitigates the power required for steering a beam in a linear waveform (e.g., triangular) along one dimension and eliminates the requirement for tuning.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. PHASE-ENCODED DETECTION OVERVIEW

Using an optical phase-encoded signal for measurement of range, the transmitted signal is in phase with a carrier (phase=0) for part of the transmitted signal and then changes by one or more phases changes represented by the symbol $\Delta\phi$ (so phase=$\Delta\phi$) for short time intervals, switching back and forth between the two or more phase values repeatedly over the transmitted signal. The shortest interval of constant phase is a parameter of the encoding called pulse duration $\tau$ and is typically the duration of several periods of the lowest frequency in the band. The reciprocal, $1/\tau$, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as $\Delta\phi*\{0, 1, 2$ and $3\}$, which, for $\Delta\phi=\pi/2$ (90 degrees), equals $\{0, \pi/2, \pi$ and $3\pi/2\}$, respectively; and, thus 4 phase values can represent 0, 1, 2, 3, respectively. In this example, each symbol is two bits and the bit rate is twice the baud rate.

Phase-shift keying (PSK) refers to a digital modulation scheme that conveys data by changing (modulating) the phase of a reference signal (the carrier wave). The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement in communications applications than ordinary PSK, since there is no need for the demodulator to have a copy of the reference signal to determine the exact phase of the received signal (thus, it is a non-coherent scheme).

For optical ranging applications, since the transmitter and receiver are in the same device, coherent PSK can be used. The carrier frequency is an optical frequency fc and an RF $f_0$ is modulated onto the optical carrier. The number N and duration $\tau$ of symbols are selected to achieve the desired range accuracy and resolution. The pattern of symbols is selected to be distinguishable from other sources of coded signals and noise. Thus a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise. In the following discussion, it is assumed that the transmitted signal is made up of M blocks of N symbols per block, where M and N are non-negative integers.

FIG. 1A is a schematic graph 120 that illustrates the example transmitted signal as a series of binary digits along with returned optical signals for measurement of range, according to an embodiment. The horizontal axis 122 indicates time in arbitrary units after a start time at zero. The vertical axis 124a indicates amplitude of an optical transmitted signal at frequency fc+$f_0$ in arbitrary units relative to zero. The vertical axis 124b indicates amplitude of an optical returned signal at frequency fc+$f_0$ in arbitrary units relative to zero, and is offset from axis 124a to separate traces. Trace 125 represents a transmitted signal of M*N binary symbols, with phase changes as shown in FIG. 1A to produce a code starting with 00011010 and continuing as indicated by ellipsis. Trace 126 represents an idealized (noiseless) return signal that is scattered from an object that is not moving (and thus the return is not Doppler shifted). The amplitude is reduced, but the code 00011010 is recognizable. Trace 127 represents an idealized (noiseless) return signal that is scattered from an object that is moving and is therefore Doppler shifted. The return is not at the proper optical frequency fc+$f_0$ and is not well detected in the expected frequency band, so the amplitude is diminished.

The observed frequency f' of the return differs from the correct frequency f=fc+f₀ of the return by the Doppler effect given by Equation 1.

$$f' = \frac{(c + v_o)}{(c + v_s)} f \tag{1}$$

Where c is the speed of light in the medium, $v_0$ is the velocity of the observer and vs is the velocity of the source along the vector connecting source to receiver. Note that the two frequencies are the same if the observer and source are moving at the same speed in the same direction on the vector between the two. The difference between the two frequencies, $\Delta f = f' - f$, is the Doppler shift, $\Delta f_D$, which causes problems for the range measurement, and is given by Equation 2.

$$\Delta f_D = \left[ \frac{(c + v_o)}{(c + v_s)} - 1 \right] f \tag{2}$$

Note that the magnitude of the error increases with the frequency f of the signal. Note also that for a stationary LIDAR system ($v_0 = 0$), for an object moving at 10 meters a second ($v_s = 10$), and visible light of frequency about 500 THz, then the size of the error is on the order of 16 megahertz (MHz, 1 MHz=$10^6$ hertz, Hz, 1 Hz=1 cycle per second). In various embodiments described below, the Doppler shift error is detected and used to process the data for the calculation of range.

In phase coded ranging, the arrival of the phase coded reflection is detected in the return by cross correlating the transmitted signal or other reference signal with the returned signal, implemented practically by cross correlating the code for a RF signal with a electrical signal from an optical detector using heterodyne detection and thus down-mixing back to the RF band. Cross correlation for any one lag is computed by convolving the two traces, i.e., multiplying corresponding values in the two traces and summing over all points in the trace, and then repeating for each time lag. Alternatively, the cross correlation can be accomplished by a multiplication of the Fourier transforms of each of the two traces followed by an inverse Fourier transform. Efficient hardware and software implementations for a Fast Fourier transform (FFT) are widely available for both forward and inverse Fourier transforms.

Note that the cross correlation computation is typically done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

For an idealized (noiseless) return signal that is reflected from an object that is not moving (and thus the return is not Doppler shifted), a peak occurs at a time $\Delta t$ after the start of the transmitted signal. This indicates that the returned signal includes a version of the transmitted phase code beginning at the time $\Delta t$. The range R to the reflecting (or backscattering) object is computed from the two way travel time delay based on the speed of light c in the medium, as given by Equation 3.

$$R = c * \Delta t / 2 \tag{3}$$

For an idealized (noiseless) return signal that is scattered from an object that is moving (and thus the return is Doppler shifted), the return signal does not include the phase encoding in the proper frequency bin, the correlation stays low for all time lags, and a peak is not as readily detected, and is often undetectable in the presence of noise. Thus $\Delta t$ is not as readily determined and range R is not as readily produced.

Figure 1B:
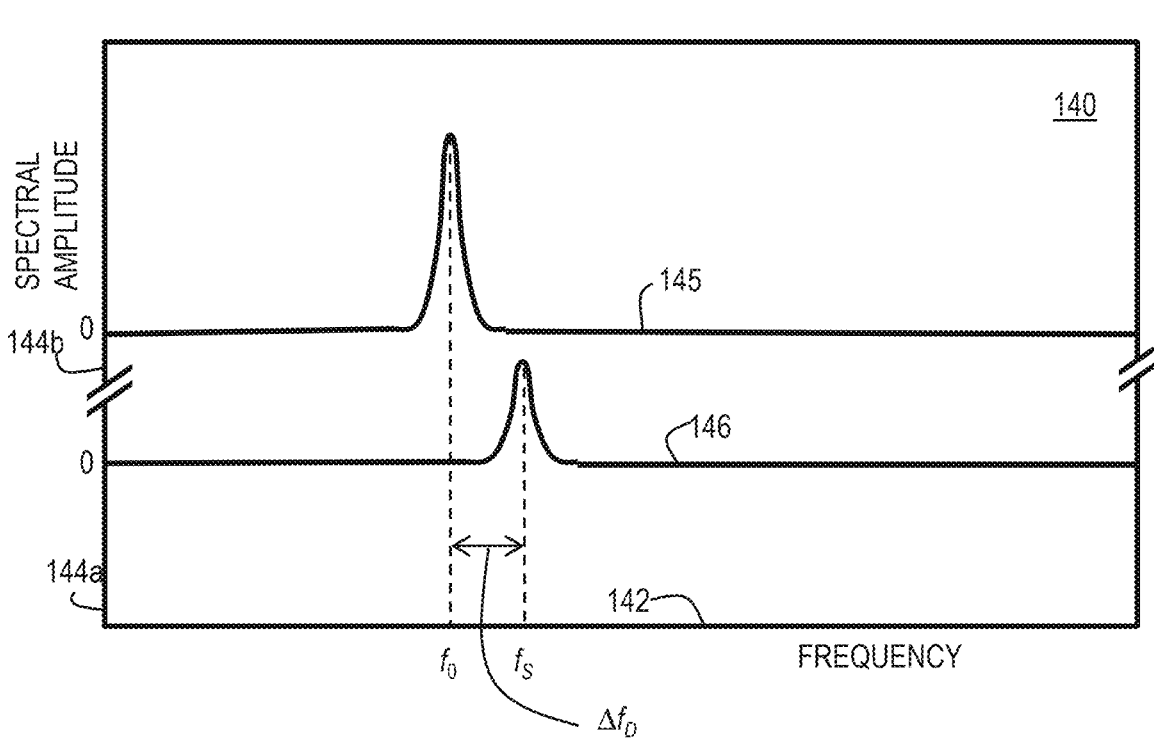
FIG. 1B is a schematic graph that illustrates an example spectrum of the reference signal and an example spectrum of a Doppler shifted return signal, according to an embodiment.

According to various embodiments of the inventor's previous work, the Doppler shift is determined in the electrical processing of the returned signal; and the Doppler shift is used to correct the cross correlation calculation. Thus a peak is more readily found and range can be more readily determined. FIG. 1B is a schematic graph 140 that illustrates an example spectrum of the transmitted signal and an example spectrum of a Doppler shifted complex return signal, according to an embodiment. The horizontal axis 142 indicates RF frequency offset from an optical carrier $f_C$ in arbitrary units. The vertical axis 144a indicates amplitude of a particular narrow frequency bin, also called spectral density, in arbitrary units relative to zero. The vertical axis 144b indicates spectral density in arbitrary units relative to zero, and is offset from axis 144a to separate traces. Trace 145 represents a transmitted signal; and, a peak occurs at the proper RF f₀. Trace 146 represents an idealized (noiseless) complex return signal that is backscattered from an object that is moving toward the LIDAR system and is therefore Doppler shifted to a higher frequency (called blue shifted). The return does not have a peak at the proper RF f₀; but, instead, is blue shifted by $\Delta f_D$ to a shifted frequency $f_S$. In practice, a complex return representing both in-phase and quadrature (I/Q) components of the return is used to determine the peak at $+\Delta f_D$, thus the direction of the Doppler shift, and the direction of motion of the target on the vector between the sensor and the object, is apparent from a single return.

Figure 1C:
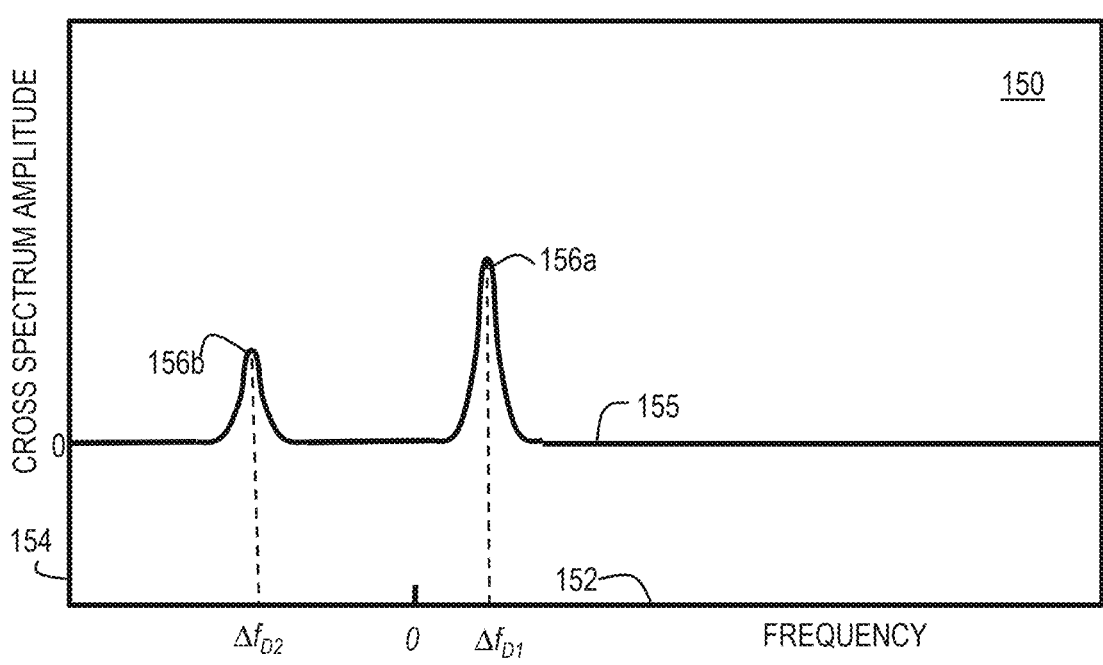
FIG. 1C is a schematic graph that illustrates an example cross-spectrum of phase components of a Doppler shifted return signal, according to an embodiment.

In some Doppler compensation embodiments, rather than finding $\Delta f_D$ by taking the spectrum of both transmitted and returned signals and searching for peaks in each, then subtracting the frequencies of corresponding peaks, as illustrated in FIG. 1B, it is more efficient to take the cross spectrum of the in-phase and quadrature component of the down-mixed returned signal in the RF band. FIG. 1C is a schematic graph 150 that illustrates an example cross-spectrum, according to an embodiment. The horizontal axis 152 indicates frequency shift in arbitrary units relative to the reference spectrum; and, the vertical axis 154 indicates amplitude of the cross spectrum in arbitrary units relative to zero. Trace 155 represents a cross spectrum with an idealized (noiseless) return signal generated by one object moving toward the LIDAR system (blue shift of $\Delta f_{D1} = \Delta f_D$ in FIG. 1B) and a second object moving away from the LIDAR system (red shift of $\Delta f_{D2}$). A peak occurs when one of the components is blue shifted $\Delta f_{D1}$; and, another peak occurs when one of the components is red shifted $\Delta f_{D2}$. Thus the Doppler shifts are determined. These shifts can be used to determine a signed velocity of approach of objects in the vicinity of the LIDAR, as can be critical for collision avoidance applications. However, if I/Q processing is not done, peaks appear at both +/−Δf_{D1} and both +/−Δf_{D2}, so there is ambiguity on the sign of the Doppler shift and thus the direction of movement.

As described in more detail in inventor's previous work the Doppler shift(s) detected in the cross spectrum are used to correct the cross correlation so that the peak 135 is apparent in the Doppler compensated Doppler shifted return at lag Δt, and range R can be determined. In some embodiments simultaneous I/Q processing is performed as described in more detail in patent application publication entitled "Method and system for Doppler detection and Doppler correction of optical phase-encoded range detection" by S. Crouch et al., the entire contents of which are hereby incorporated by reference as if fully set forth herein. In other embodiments, serial I/Q processing is used to determine the sign of the Doppler return as described in more detail in patent application publication entitled "Method and System for Time Separated Quadrature Detection of Doppler Effects in Optical Range Measurements" by S. Crouch et al., the entire contents of which are hereby incorporated by reference as if fully set forth herein. In other embodiments, other means are used to determine the Doppler correction; and, in various embodiments, any method known in the art to perform Doppler correction is used. In some embodiments, errors due to Doppler shifting are tolerated or ignored; and, no Doppler correction is applied to the range measurements.

2. CHIRPED DETECTION OVERVIEW

Figure 1D:
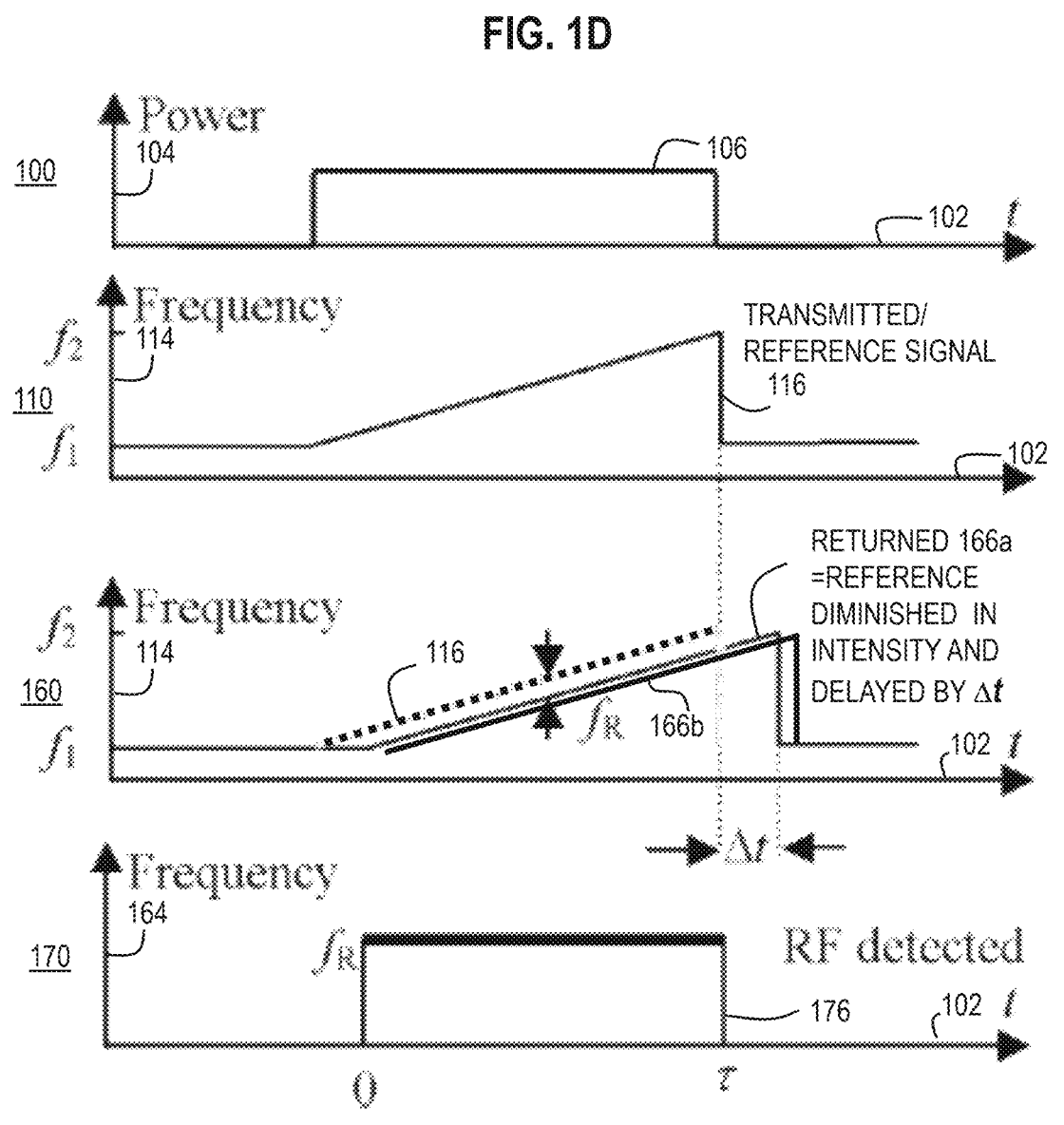

FIG. 1D is a set of graphs that illustrates an example optical chirp measurement of range, according to an embodiment. The horizontal axis 102 is the same for all four graphs and indicates time in arbitrary units, on the order of milliseconds (ms, 1 ms=$10^{-3}$ seconds). Graph 100 indicates the power of a beam of light used as a transmitted optical signal. The vertical axis 104 in graph 100 indicates power of the transmitted signal in arbitrary units. Trace 106 indicates that the power is on for a limited pulse duration, r starting at time 0. Graph 110 indicates the frequency of the transmitted signal. The vertical axis 114 indicates the frequency transmitted in arbitrary units. The trace 116 indicates that the frequency of the pulse increases from $f_1$ to $f_2$ over the duration r of the pulse, and thus has a bandwidth B=$f_2$−$f_1$. The frequency rate of change is $(f_2-f_1)/\tau$.

The returned signal is depicted in graph 160 which has a horizontal axis 102 that indicates time and a vertical axis 114 that indicates frequency as in graph 110. The chirp 116 of graph 110 is also plotted as a dotted line on graph 160. A first returned signal is given by trace 166a, which is just the transmitted reference signal diminished in intensity (not shown) and delayed by Δt. When the returned signal is received from an external object after covering a distance of 2R, where R is the range to the target, the returned signal start at the delayed time Δt is given by 2R/c, where c is the speed of light in the medium (approximately 3×$10^8$ meters per second, m/s), related according to Equation 3, described above. Over this time, the frequency has changed by an amount that depends on the range, called $f_R$, and given by the frequency rate of change multiplied by the delay time. This is given by Equation 4a.

$$f_R = (f_2 - f_1)/\tau * 2R/c = 2BR/c\tau \qquad (4a)$$

The value of $f_R$ is measured by the frequency difference between the transmitted signal 116 and returned signal 166a in a time domain mixing operation referred to as de-chirping. So the range R is given by Equation 4b.

$$R = f_R c\tau/2B \qquad (4b)$$

Of course, if the returned signal arrives after the pulse is completely transmitted, that is, if 2R/c is greater than τ, then Equations 4a and 4b are not valid. In this case, the reference signal is delayed a known or fixed amount to ensure the returned signal overlaps the reference signal. The fixed or known delay time of the reference signal is multiplied by the speed of light, c, to give an additional range that is added to range computed from Equation 4b. While the absolute range may be off due to uncertainty of the speed of light in the medium, this is a near-constant error and the relative ranges based on the frequency difference are still very precise.

In some circumstances, a spot illuminated (pencil beam cross section) by the transmitted light beam encounters two or more different scatterers at different ranges, such as a front and a back of a semitransparent object, or the closer and farther portions of an object at varying distances from the LIDAR, or two separate objects within the illuminated spot. In such circumstances, a second diminished intensity and differently delayed signal will also be received, indicated on graph 160 by trace 166b. This will have a different measured value of $f_R$ that gives a different range using Equation 4b. In some circumstances, multiple additional returned signals are received.

Graph 170 depicts the difference frequency $f_R$ between a first returned signal 166a and the reference chirp 116. The horizontal axis 102 indicates time as in all the other aligned graphs in FIG. 1D, and the vertical axis 164 indicates frequency difference on a much expanded scale. Trace 176 depicts the constant frequency $f_R$ measured in response to the transmitted chirp, which indicates a particular range as given by Equation 4b. The second returned signal 166b, if present, would give rise to a different, larger value of $f_R$ (not shown) during de-chirping; and, as a consequence yield a larger range using Equation 4b.

A common method for de-chirping is to direct both the reference optical signal and the returned optical signal to the same optical detector. The electrical output of the detector is dominated by a beat frequency that is equal to, or otherwise depends on, the difference in the frequencies of the two signals converging on the detector. A Fourier transform of this electrical output signal will yield a peak at the beat frequency. This beat frequency is in the radio frequency (RF) range of Megahertz (MHz, 1 MHz=$10^6$ Hertz=$10^6$ cycles per second) rather than in the optical frequency range of Terahertz (THz, 1 THz=$10^{12}$ Hertz). Such signals are readily processed by common and inexpensive RF components, such as a Fast Fourier Transform (FFT) algorithm running on a microprocessor or a specially built FFT or other digital signal processing (DSP) integrated circuit. In other embodiments, the return signal is mixed with a continuous wave (CW) tone acting as the local oscillator (versus a chirp as the local oscillator). This leads to the detected signal which itself is a chirp (or whatever waveform was transmitted). In this case the detected signal would undergo matched filtering in the digital domain as described in Kachelmyer 1990, the entire contents of which are hereby incorporated by reference as if fully set forth herein, except for terminology inconsistent with that used herein. The disadvantage is that the digitizer bandwidth requirement is generally higher. The positive aspects of coherent detection are otherwise retained.

In some embodiments, the LIDAR system is changed to produce simultaneous up and down chirps. This approach eliminates variability introduced by object speed differences, or LIDAR position changes relative to the object which actually does change the range, or transient scatterers in the beam, among others, or some combination. The approach then guarantees that the Doppler shifts and ranges measured on the up and down chirps are indeed identical and can be most usefully combined. The Doppler scheme guarantees parallel capture of asymmetrically shifted return pairs in frequency space for a high probability of correct compensation.

Figures 1E, 1F:
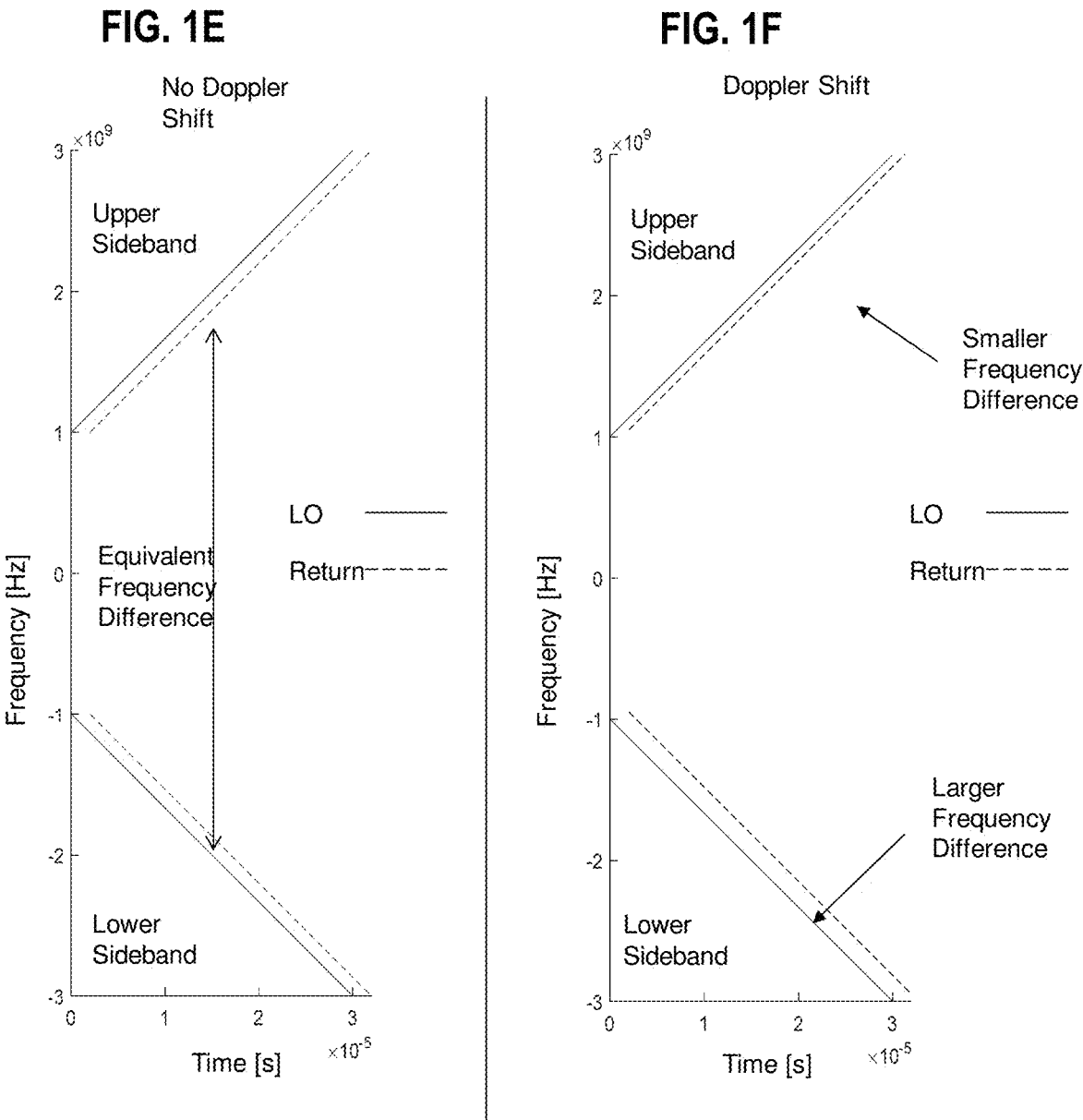
FIG. 1E is a graph using a symmetric LO signal, and shows the return signal in this frequency time plot as a dashed line when there is no Doppler shift, according to an embodiment.
FIG. 1F is a graph similar to FIG. 1E, using a symmetric LO signal, and shows the return signal in this frequency time plot as a dashed line when there is a non-zero Doppler shift, according to an embodiment.

FIG. 1E is a graph using a symmetric LO signal, and shows the return signal in this frequency time plot as a dashed line when there is no Doppler shift, according to an embodiment. The horizontal axis indicates time in example units of $10^{-5}$ seconds (tens of microseconds). The vertical axis indicates frequency of the optical transmitted signal relative to the carrier frequency fc or reference signal in example units of GigaHertz (109 Hertz). During a pulse duration, a light beam comprising two optical frequencies at any time is generated. One frequency increases from $f_1$ to $f_2$ (e.g., 1 to 2 GHz above the optical carrier) while the other frequency simultaneous decreases from $f_4$ to $f_3$ (e.g., 1 to 2 GHz below the optical carrier). The two frequency bands e.g., band 1 from $f_1$ to $f_2$, and band 2 from $f_3$ to $f_4$) do not overlap so that both transmitted and return signals can be optically separated by a high pass or a low pass filter, or some combination, with pass bands starting at pass frequency $f_p$. For example $f_1 < f_2 < f_p < f_3 < f_4$. Though, in the illustrated embodiment, the higher frequencies provide the up chirp and the lower frequencies provide the down chirp, in other embodiments, the higher frequencies produce the down chirp and the lower frequencies produce the up chirp.

In some embodiments, two different laser sources are used to produce the two different optical frequencies in each beam at each time. However, in some embodiments, a single optical carrier is modulated by a single RF chirp to produce symmetrical sidebands that serve as the simultaneous up and down chirps. In some of these embodiments, a double sideband Mach-Zehnder intensity modulator is used that, in general, does not leave much energy in the carrier frequency; instead, almost all of the energy goes into the sidebands.

As a result of sideband symmetry, the bandwidth of the two optical chirps will be the same if the same order sideband is used. In other embodiments, other sidebands are used, e.g., two second order sideband are used, or a first order sideband and a non-overlapping second sideband is used, or some other combination.

As described in U.S. patent application publication by Crouch et al., entitled "Method and System for Doppler Detection and Doppler Correction of Optical Chirped Range Detection," when selecting the transmit (TX) and local oscillator (LO) chirp waveforms, it is advantageous to ensure that the frequency shifted bands of the system take maximum advantage of available digitizer bandwidth. In general this is accomplished by shifting either the up chirp or the down chirp to have a range frequency beat close to zero.

FIG. 1F is a graph similar to FIG. 1E, using a symmetric LO signal, and shows the return signal in this frequency time plot as a dashed line when there is a non-zero Doppler shift. In the case of a chirped waveform, the time separated I/Q processing (aka time domain multiplexing) can be used to overcome hardware requirements of other approaches as described above. In that case, an AOM is used to break the range-Doppler ambiguity for real valued signals. In some embodiments, a scoring system is used to pair the up and down chirp returns as described in more detail in patent application publication entitled "Method and system for Doppler detection and Doppler correction of optical chirped range detection" by S. Crouch et al., the entire contents of which are hereby incorporated by reference as if fully set forth herein. In other embodiments, I/Q processing is used to determine the sign of the Doppler chirp as described in more detail in patent application publication entitled "Method and System for Time Separated Quadrature Detection of Doppler Effects in Optical Range Measurements" by S. Crouch et al., the entire contents of which are hereby incorporated by reference as if fully set forth herein.

3. OPTICAL DETECTION HARDWARE OVERVIEW

Figure 2A:
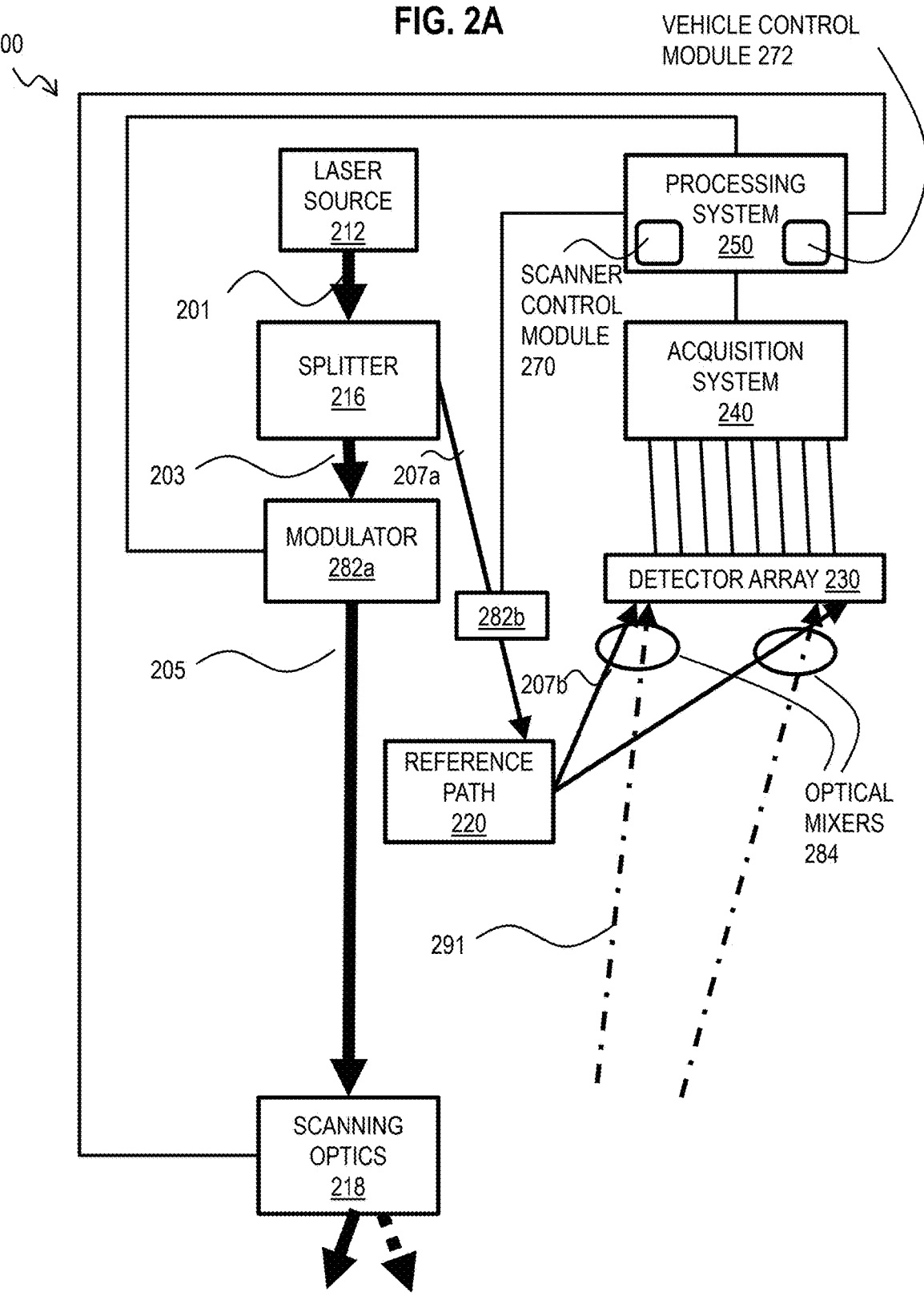
FIG. 2A is a block diagram that illustrates example components of a high resolution (hi res) LIDAR system, according to an embodiment.

In order to depict how to use hi-res range-Doppler detection systems, some generic hardware approaches are described. FIG. 2A is a block diagram that illustrates example components of a high resolution range LIDAR system 200, according to an embodiment. Optical signals are indicated by arrows. Electronic wired or wireless connections are indicated by segmented lines without arrowheads. A laser source 212 emits a carrier wave 201 that is phase or frequency modulated in modulator 282a, before or after splitter 216, to produce a phase coded or chirped optical signal 203 that has a duration D. A splitter 216 splits the modulated (or, as shown, the unmodulated) optical signal for use in a reference path 220. A target beam 205, also called transmitted signal herein, with most of the energy of the beam 201 is produced. A modulated or unmodulated reference beam 207a with a much smaller amount of energy that is nonetheless enough to produce good mixing with the returned light 291 scattered from an object (not shown) is also produced. In the illustrated embodiment, the reference beam 207a is separately modulated in modulator 282b. The reference beam 207a passes through reference path 220 and is directed to one or more detectors as reference beam 207b. In some embodiments, the reference path 220 introduces a known delay sufficient for reference beam 207b to arrive at the detector array 230 with the scattered light from an object outside the LIDAR within a spread of ranges of interest. In some embodiments, the reference beam 207b is called the local oscillator (LO) signal referring to older approaches that produced the reference beam 207b locally from a separate oscillator. In various embodiments, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2A, with or without a path length adjustment to compensate for the phase or frequency difference observed or expected for a particular range; or, 3) using a frequency shifting device (acousto-optic modulator) or time delay of a local oscillator waveform modulation (e.g., in modulator 282b) to produce a separate modulation to compensate for path length mismatch; or some combination. In some embodiments, the object is close enough and the transmitted duration long enough that the returns sufficiently overlap the reference signal without a delay.

The transmitted signal is then transmitted to illuminate an area of interest, often through some scanning optics 218. The detector array is a single paired or unpaired detector or a 1 dimensional (1D) or 2 dimensional (2D) array of paired or unpaired detectors arranged in a plane roughly perpendicular to returned beams 291 from the object. The reference beam 207b and returned beam 291 are combined in zero or more optical mixers 284 to produce an optical signal of characteristics to be properly detected. The frequency, phase or amplitude of the interference pattern, or some combination, is recorded by acquisition system 240 for each detector at multiple times during the signal duration D. The number of temporal samples processed per signal duration or integration time affects the down-range extent. The number or integration time is often a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the chirp or unique phase code before it repeats (for unambiguous ranging). This is enabled because any digital record of the returned heterodyne signal or bits could be compared or cross correlated with any portion of transmitted bits from the prior transmission history.

The acquired data is made available to a processing system 250, such as a computer system described below with reference to FIG. 7, or a chip set described below with reference to FIG. 8. A scanner control module 270 provides scanning signals to drive the scanning optics 218, according to one or more of the embodiments described below. In one embodiment, the scanner control module 270 includes instructions to perform one or more steps of the method 600 related to the flowchart of FIG. 6. A signed Doppler compensation module (not shown) in processing system 250 determines the sign and size of the Doppler shift and the corrected range based thereon along with any other corrections. The processing system 250 also includes a modulation signal module (not shown) to send one or more electrical signals that drive modulators 282a, 282b. In some embodiments, the processing system also includes a vehicle control module 272 to control a vehicle on which the system 200 is installed.

Any known apparatus or system may be used to implement the laser source 212, modulators 282a, 282b, beam splitter 216, reference path 220, optical mixers 284, detector array 230, scanning optics 218, or acquisition system 240. Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

FIG. 2A also illustrates example components for a simultaneous up and down chirp LIDAR system according to one embodiment. In this embodiment, the modulator 282a is a frequency shifter added to the optical path of the transmitted beam 205. In other embodiments, the frequency shifter is added instead to the optical path of the returned beam 291 or to the reference path 220. In general, the frequency shifting element is added as modulator 282b on the local oscillator (LO, also called the reference path) side or on the transmit side (before the optical amplifier) as the device used as the modulator (e.g., an acousto-optic modulator, AOM) has some loss associated and it is disadvantageous to put lossy components on the receive side or after the optical amplifier. The purpose of the optical shifter is to shift the frequency of the transmitted signal (or return signal) relative to the frequency of the reference signal by a known amount Afs, so that the beat frequencies of the up and down chirps occur in different frequency bands, which can be picked up, e.g., by the FFT component in processing system 250, in the analysis of the electrical signal output by the optical detector 230. For example, if the blue shift causing range effects is $f_B$, then the beat frequency of the up chirp will be increased by the offset and occur at $f_B$+Afs and the beat frequency of the down chirp will be decreased by the offset to $f_B$-Afs. Thus, the up chirps will be in a higher frequency band than the down chirps, thereby separating them. If Afs is greater than any expected Doppler effect, there will be no ambiguity in the ranges associated with up chirps and down chirps. The measured beats can then be corrected with the correctly signed value of the known Afs to get the proper up-chirp and down-chirp ranges. In some embodiments, the RF signal coming out of the balanced detector is digitized directly with the bands being separated via FFT. In some embodiments, the RF signal coming out of the balanced detector is preprocessed with analog RF electronics to separate a low-band (corresponding to one of the up chirp or down chip) which can be directly digitized and a high-band (corresponding to the opposite chirp) which can be electronically down-mixed to baseband and then digitized. Both embodiments offer pathways that match the bands of the detected signals to available digitizer resources. In some embodiments, the modulator 282a is excluded (e.g. direct ranging).

Figure 2B:
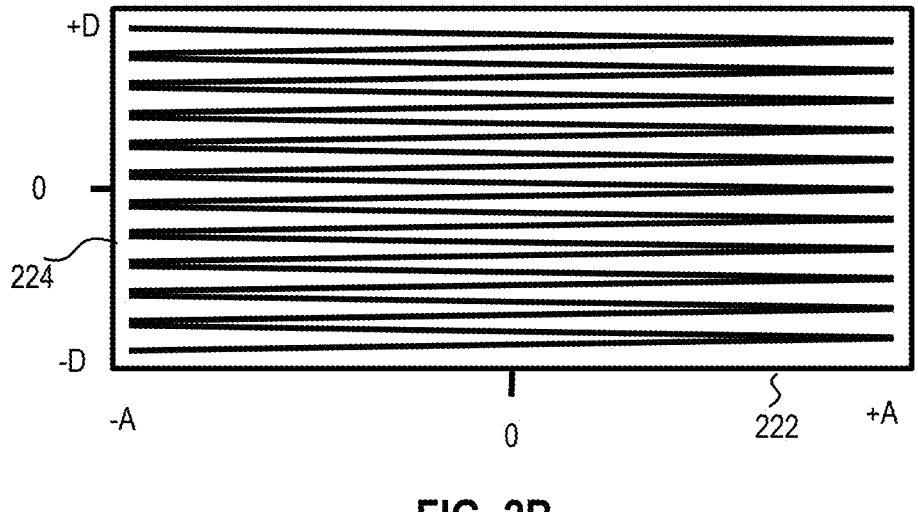
FIG. 2B is a block diagram that illustrates a saw tooth scan pattern for a hi-res Doppler system, used in some embodiments.
Figure 2C:
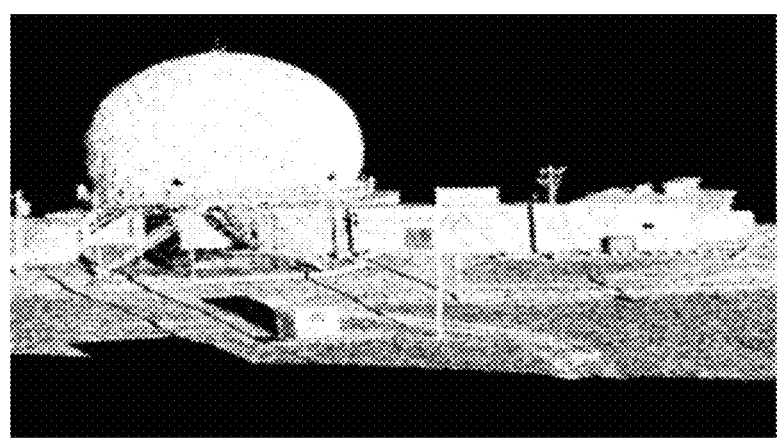
FIG. 2C is an image that illustrates an example speed point cloud produced by a hi-res Doppler LIDAR system, according to an embodiment.

FIG. 2B is a block diagram that illustrates a simple saw tooth scan pattern for a hi-res Doppler system. The scan sweeps through a range of azimuth angles (e.g. horizontally along axis 222) and inclination angles (e.g. vertically along axis 224 above and below a level direction at zero inclination). In various embodiments described below, other scan patterns are used. Any scan pattern known in the art may be used in various embodiments. For example, in some embodiments, adaptive scanning is performed using methods described in PCT patent applications by Crouch entitled "Method and system for adaptive scanning with optical ranging systems," or entitled "Method and system for automatic real-time adaptive scanning with optical ranging systems," the entire contents of each of which are hereby incorporated by reference as if fully set forth herein. FIG. 2C is an image that illustrates an example speed point cloud produced by a hi-res Doppler LIDAR system, according to an embodiment.

Figures 3, 4C, 4D, 4E, 4F:
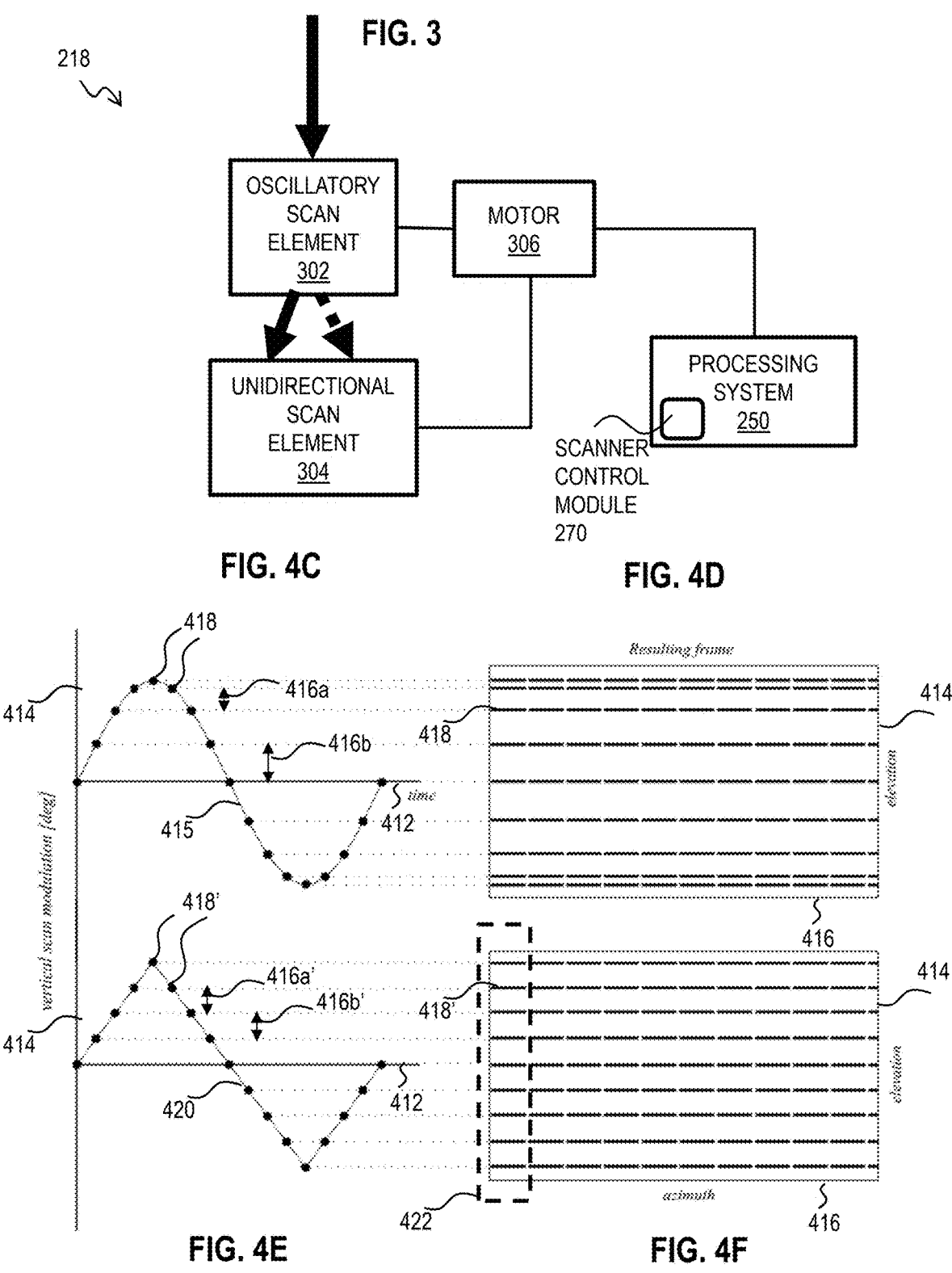
FIG. 3 is a block diagram that illustrates example components of the scanning optics of the system of FIG. 2A, according to an embodiment.
FIG. 4C is a graph that illustrates an example of a sinusoid curve indicating a projected angle of the scanned beam of FIG. 4A onto an axis, according to an embodiment.
FIG. 4D is a graph that illustrates an example of scan lines of unequal spacing along the axis based on the sinusoid curve of FIG. 4C, according to an embodiment.
FIG. 4E is a graph that illustrates an example of a triangular waveform indicating a projected angle of the scanned beam of FIG. 2A onto an axis, according to an embodiment.
FIG. 4F is a graph that illustrates an example of scan lines of equal spacing along the axis based on the triangular waveform of FIG. 4E, according to an embodiment.

FIG. 3 is a block diagram that illustrates example components of the scanning optics 218 of the system 200 of FIG. 2A, according to an embodiment. In an embodiment, the scanning optics 218 is a two-element scan system including an oscillatory scan element 302 that controls actuation of the beam 205 along one axis (e.g. between angles-A and +A along axis 222 of FIG. 2B) and a unidirectional constant speed scan element 304 (e.g. polygon scanner) that controls actuation of the beam 205 along another axis (e.g. along axis 224 of FIG. 2B). In one embodiment, the scanning optics 218 includes one or the oscillatory scan element 302 and the unidirectional constant speed scan element 304 and excludes the motor 306 and processing system 250 and the scanning optics 218 is used in systems other than the system 200. In an example embodiment, the oscillatory scan element 302 actuates the beam 205 along the axis 222 between the angles −A and +A as the unidirectional constant speed scan element 304 simultaneously actuates the beam 205 along the axis 224. In an example embodiment, the actuation speed of the oscillatory scan element 302 is bi-directional and greater than the unidirectional actuation speed of the constant speed scan element 304, so that the beam 205 is scanned along the axis 222 (e.g. between angles −A to +A) multiple times for each instance that the beam is scanned along the axis 224 (e.g. between angles=D to +D).

In some embodiments, the scanner control module 270 provides signals that are transmitted from the processing system 250 to a motor 306 that is mechanically coupled to the oscillatory scan element 302 and/or the unidirectional scan element 304. In one embodiment, two motors are provided where one motor is mechanically coupled to the oscillatory scan element 302 and another motor is mechanically coupled to the unidirectional scan element 304. In an example embodiment, based on the signals received from the processing system 250, the motor 306 rotates the oscillatory scan element 302 and/or the unidirectional scan element 304 based on a value of a parameter (e.g. angular speed, etc) in the signal. The scanner control module 270 determines the value of the parameter in the signal so that the beam 205 is scanned by the oscillatory scan element 302 by a desired scan pattern (e.g. between angles −A to +A along axis 222) and/or by the unidirectional constant speed scan element 304 in a desired scan pattern (e.g. between angles=D to +D along axis 224).

4. COHERENT LIDAR SYSTEM FOR REFRACTIVE BEAM-STEERING

Figure 4A:
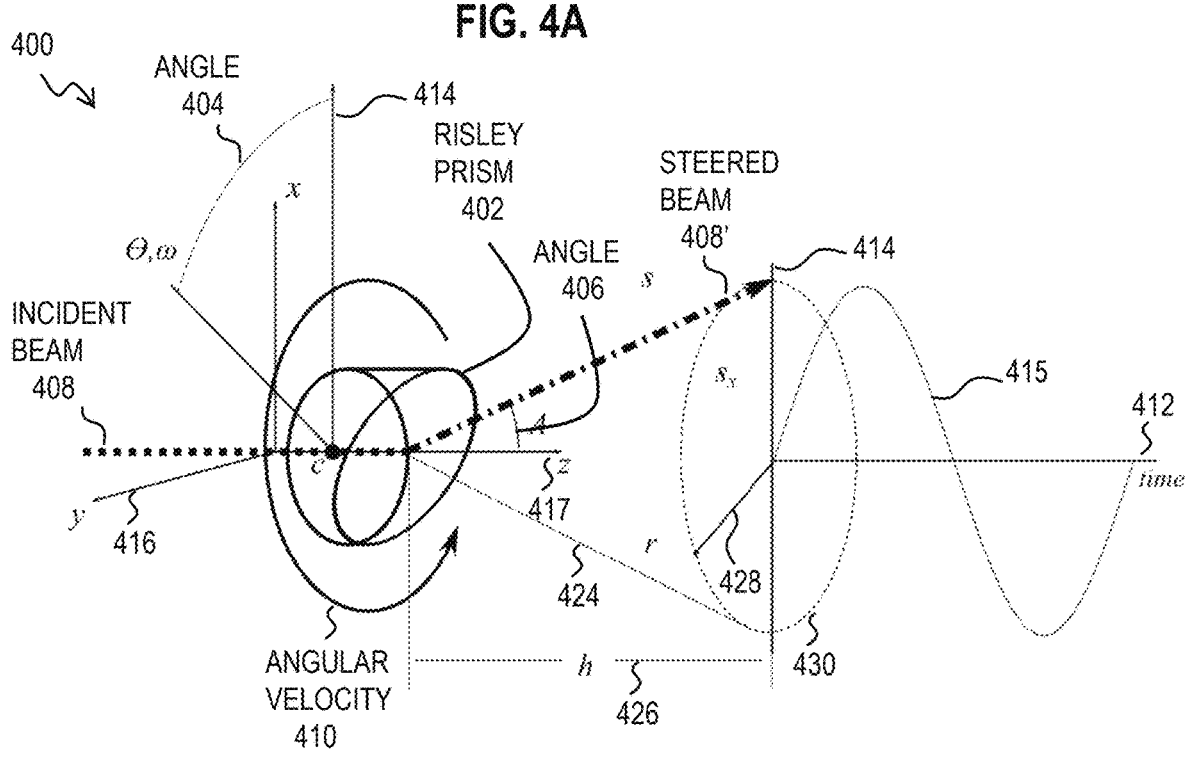
FIG. 4A is an image that illustrates an example of an optical component of the scanning optics of FIG. 3 steering an incident beam at an angle to define a cone shaped surface based on rotation of the optical component about an axis, according to an embodiment.
Figure 4B:
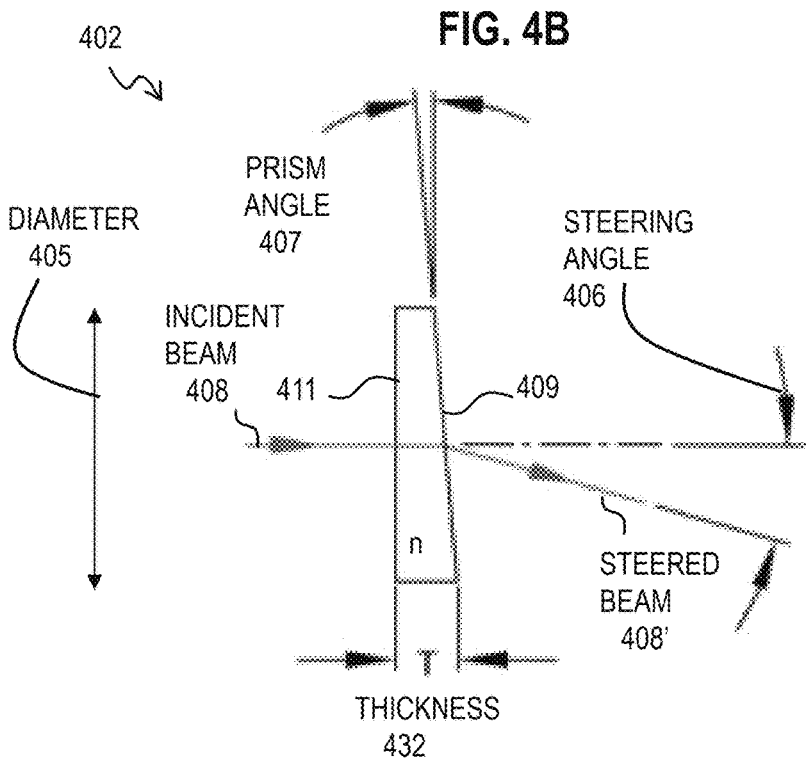
FIG. 4B is an image that illustrates example characteristics of the optical component of FIG. 4A, according to an embodiment.

FIGS. 4A and 4B are images that illustrate an example of an assembly 400 including an optical component 402 of the scanning optics 218 of FIG. 3 that steers an incident beam 408 at a steering angle 406 to define a cone shaped surface 424 based on rotation of the optical component 402 about an axis 417, according to an embodiment. In an embodiment, the optical component 402 is the oscillatory scan element 302 to optimize scanning of the incident beam 408 along an axis 414 perpendicular to the axis 417 between a first and second angle (e.g. between−A and +A along axis 222 of FIG. 2B). The optical component 402 is rotated about the axis 417 based on an angular velocity 410 that varies an angle 404 of the optical scan element 402 measured with respect to the axis 414.

In one embodiment, the optical component 402 is a Risley prism with an angled face 409 (FIG. 4B) defined by a prism angle 407 measured with respect to a non-angled face 411 that is orthogonal to a base of the prism. As appreciated by one of ordinary skill in the art, the steering angle 406 is calculated using Snell's law with a ratio of indices of refraction of the Risley prism 402 to outside medium (e.g. air) and an incident angle on the angled face 409 where refraction occurs. In one example embodiment, the steering angle 406 is measured with respect to the direction of the incident beam 408 and thus is smaller than the angle of refraction at the angled face 409 (e.g. which is measured with respect to the normal to the angled face 409).

As the Risley prism 402 rotates about the axis 417, the steered beam 408' sweeps around the axis 417 and defines the cone shaped surface 424 with a circular base 430 and radius 428 in a two-dimensional plane having an axial separation 426 along the axis 417 from the Risley prism 402. The steered vector beam 408' is defined by a vector ($S_x$, $S_y$, $S_z$) which is defined by the parametric equations:

$$S_x = \frac{h-u}{h} r * \sin\theta \qquad (5a)$$

16

-continued $$S_y = \frac{h-u}{h} r * \cos\theta \qquad (5b)$$

$$S_z = -u + c \qquad (5c)$$

where θ is the angle 404 defined on a domain from [0, 2π]; h is the axial separation 426; r is the radius 428; u is a variable defined on a domain from [0, h] and c is a coordinate along the axis 417 where the beam exits the Risley prism 402 and where the nappe of the cone shaped surface 424 is placed. Per equations 5a-5c, the cone radius 428 is maximized when u=0 and ($S_x$, $S_y$) define a circle with radius r in the two-dimensional plane perpendicular to the axis 417. Per equation 5a, the component of the steered beam 408' along the x axis 414 is r sin 0. The relationship between the angle 406, the radius 428 and the axial separation 426 is:

$$\tan(A) = \frac{r}{h} \qquad (6)$$

where A is the steering angle 406; r is the radius 428 and h is the axial separation 426.

A projection of the steered beam angle 406 along the axis 414 over time is depicted by curve 415 which is a sinusoid. The horizontal axis 412 is time in arbitrary units. The vertical axis 414 is angle in arbitrary units. In an embodiment, the curve 415 indicates a projection of the steering angle 406 along the axis 414 (e.g. vertical component of in FIG. 4A) as the steered beam 408' rotates around the circular base 430 over time.

FIG. 4C is a graph that illustrates an example of the sinusoid curve 415 indicating a projection of the steering angle 406 of FIG. 4A onto the axis 414, according to an embodiment. Scan lines 418 are depicted along the curve 415 and the scan lines 418 each indicate a time along the curve 415 when return beam data is received from a target. In an embodiment, the scan lines 418 have about equal time spacing based on a target with relatively constant range. FIG. 4C depicts uneven spacing 416*a*, 416*b* along the axis 414 between scan lines 418 along the curve 415. The inventors of the present invention recognized that this uneven spacing 416*a*, 416*b* is disadvantageous since it indicates non-uniform coverage of return data as the beam 408' is scanned along the axis 414. The inventor of the present invention recognized that it would be advantageous to have relatively even spacing between scan lines 418 to achieve uniform coverage of return beam data as the beam 408' is scanned over the angle range of the axis 414. FIG. 4D is a graph that illustrates an example of scan lines 418 of unequal spacing along the axis 414 based on the sinusoid curve 415 of FIG. 4C, according to an embodiment. Axis 416 is orthogonal to the axis 414 and in one embodiment, axis 416 indicates a direction in which the beam is scanned by the unidirectional scan element 304 (e.g. axis 224 in FIG. 2B).

FIG. 4E is a graph that illustrates an example of a triangular waveform 420 indicating a projection of the steering angle 406 of the scanned beam 205 of FIG. 2A onto an axis 414, according to an embodiment. The inventors of the present invention recognized that a curve with a linear slope, such as the triangular waveform 420 avoids the disadvantage of the curve 415 of FIG. 4C since the spacing 416*a'*, 416*b'* between the scan lines 418' along the axis 414 is equal. This advantageously achieves uniform coverage of return beam data as the beam is scanned over the angle range of the axis 414. FIG. 4F is a graph that illustrates an example of scan lines 418' of equal spacing along the axis 414 based on the triangular waveform 420 of FIG. 4E, according to an embodiment. Box 422 indicates a single scan of the beam over the angle range including scan lines 418 between the first angle and second angle over the axis 414 (e.g. between-A and +A along axis 222 of FIG. 2B), before the unidirectional scan element 304 moves the beam along the axis 416 and a subsequent scan is performed between the first and second angles over the axis 414.

The inventors of the present invention recognized that it would be advantageous to combine one or more optical components (e.g. one or more Risley prisms) in the oscillatory scan element 302 so to achieve a waveform that closely approximates the triangular waveform 420 (e.g. even spacing of the scan lines and/or uniform coverage of return beam data along the axis 414) rather than the sinusoid waveform 415 (e.g. uneven spacing of the scan lines and/or non-uniform coverage of return beam data along the axis 414).

FIG. 4G is an image that illustrates an example of an assembly 400' with sequentially arranged optical components along an optical axis 417 that collectively steer a beam 408 perpendicular to the optical axis 417 based on collective rotation of the optical components, according to an embodiment. In an embodiment, the optical components are Risley prisms 402a, 402b, 402c. In another embodiment, three optical components are provided. However, fewer or more than three optical components can be sequentially arranged along the optical axis 417. In an embodiment, values of one or more parameters (e.g. prism angle 407, index n, steering angle 406, etc.) of each Risley prism 402a, 402b, 402c is determined based on the method of FIG. 6. In an example embodiment, the parameter values of each Risley prism 402a, 402b, 402c are determined so that each Risley prism steers the beam 408 based on a respective Fourier component waveform of a desired waveform (e.g. triangular waveform 420). Additionally, in another embodiment, the Risley prisms 402a, 402b, 402c are rotated based on a respective angular velocities 410a, 410b, 410c. In an embodiment, the value of the angular velocities 410a, 410b, 410c is determined based on the method of FIG. 6. In an example embodiment, the values of the angular velocities 410a, 410b, 410c are determined based on the frequencies of respective Fourier component waveforms of the desired waveform (e.g. triangular waveform 420). In one embodiment, the Risley prisms 402a, 402b, 402c and their respective angular velocities 410a, 410b, 410c are selected so that the collective steering of the steered beam 408" along the axis 414 over time closely approximates the triangular waveform 420 of FIG. 4E. This advantageously achieves even spacing or close to even spacing between the scan lines 418 as the beam is scanned along the axis 414.

FIG. 4H is a graph that illustrates an example of a projection of the steering angle 406a of FIG. 4A in a two-dimensional plane orthogonal to the axis 417 by the first Risley prism 402a and an angular velocity vector of the first Risley prism 402a, according to an embodiment. In an embodiment, FIG. 4H depicts the steering angle 406a of the steered beam 408' by the first Risley prism 402a in the plane defined by the axes 414, 416 and further depicts the angular velocity 410a of the first Risley prism 402a. FIG. 4K is a graph that illustrates an example of a sinusoid curve 415a indicating a projection of the steering beam angle 406a of FIG. 4H along the vertical axis 414 of the two-dimensional plane over time due to rotation of the first Risley prism 402a, according to an embodiment.

FIG. 4I is a graph that illustrates an example of a projection of the steering angle 406b of FIG. 4A in a two-dimensional plane orthogonal to the axis 417 by the second Risley prism 402b and an angular velocity vector of the second Risley prism 402b, according to an embodiment. In an embodiment, FIG. 4I depicts the steering angle 406b of the steered beam 408' by the second Risley prism 402b in the plane defined by the axes 414, 416 and further depicts the angular velocity 410b of the second Risley prism 402b. In an embodiment, the steering angle 406b of the steered beam 408' by the second Risley prism 402b is less than the steering angle 406a of the steered beam 408' by the first Risley prism 402a. FIG. 4L is a graph that illustrates an example of a sinusoid curve 415b indicating a projection of the steering beam angle 406b of FIG. 4I along the vertical axis 414 of the two-dimensional plane over time due to rotation of the second Risley prism 402b, according to an embodiment.

FIG. 4J is a graph that illustrates an example of a projection of the steering angle 406c of FIG. 4A in a two-dimensional plane orthogonal to the axis 417 by the third Risley prism 402c and an angular velocity vector of the third Risley prism 402c, according to an embodiment. In an embodiment, FIG. 4J depicts the steering angle 406c of the steered beam 408' by the third Risley prism 402c in the plane defined by the axes 414, 416 and further depicts the angular velocity 410c of the third Risley prism 402c. In an embodiment, the steering angle 406c of the steered beam 408' by the third Risley prism 402c is less than the steering angles 406a, 406b of the steered beam 408' by the first and second Risley prisms 402a, 402b. FIG. 4M is a graph that illustrates an example of a sinusoid curve 415c indicating a projection of the steering beam angle 406c of FIG. 4J along the vertical axis 414 of the two-dimensional plane over time due to rotation of the third Risley prism 402c, according to an embodiment.

Figures 4N, 4O, 4P:
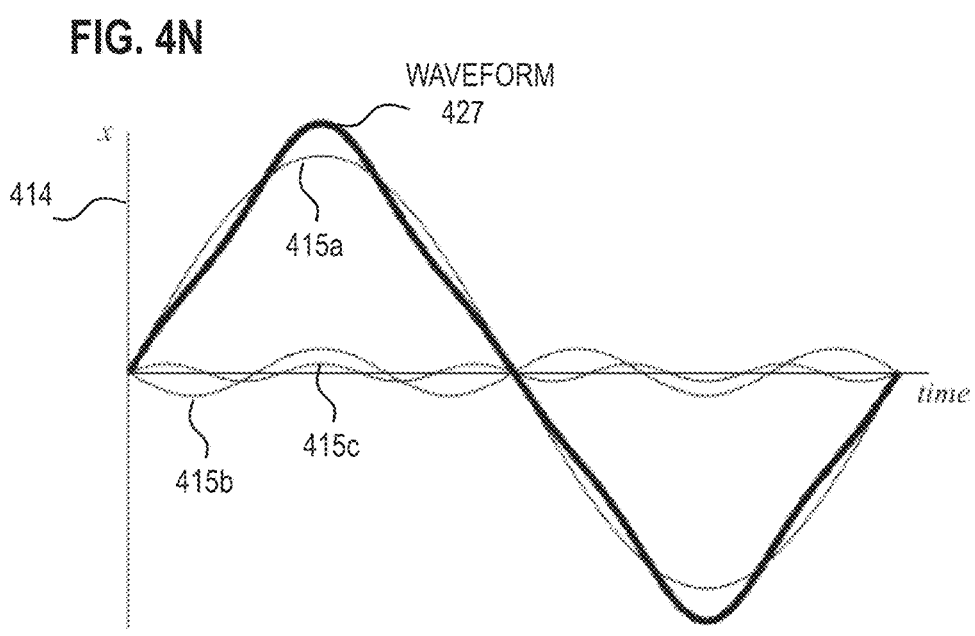
FIG. 4N is a graph that illustrates an example of a waveform generated by combining the sinusoid waveforms of FIGS. 4K-4M that indicates the projected angle of the steered beam of FIG. 4G along the vertical direction of the two-dimensional plane, according to an embodiment.
FIG. 4O is a graph that illustrates an example of a triangular waveform of unit amplitude and a sinusoid waveform of unit amplitude, according to an embodiment.
FIG. 4P is a graph that illustrates an example of a triangular waveform and a waveform generated by combining the sinusoids of FIGS. 4K-4M, according to an embodiment.

FIG. 4N is a graph that illustrates an example of a waveform 427 generated by combining the sinusoid waveforms 415a, 415b, 415c of FIGS. 4K-4M, where the waveform 427 indicates the projection of the steering angle 406 of the steered beam 408" of FIG. 4G along the axis 414 of the two-dimensional plane, according to an embodiment. As shown in FIG. 4N, the sinusoid waveforms 415a, 415b, 415c are in phase at certain time periods, e.g. when they all peak together and generate the peak of the waveform 427 or are all at valleys together and generate the valley of the waveform 427. In an embodiment, the waveform 427 is intended to approximate the triangular waveform 420 of FIG. 4E so to achieve a uniform or near uniform spacing 416' of the scan lines 418' along the axis 414.

FIG. 4O is a graph that illustrates an example of a triangular waveform 440 with unit amplitude and a sinusoid waveform 442 with unit amplitude. FIG. 4P is a graph that illustrates an example of the triangular waveform 420 and the waveform 427 generated by combining the sinusoids of FIGS. 4K-4M, according to an embodiment. The inventor of the present invention realized a tradeoff between the number of the optical components (e.g. Risley prisms 402) used to steer the beam 408 and the approximation of the triangular waveform 420. In an example embodiment, the inventors of the present invention recognized that the sinusoid waveform 442 (e.g. which can be generated with one Risley prism) achieves a mean-squared error with the triangular waveform 440 of about 37%, whereas the waveform 427 generated using three Risley prisms 402a, 402b, 402c achieved a mean squared error with the triangular waveform of only 3.4%. Thus, in one embodiment, the inventor of the present invention used three Risley prisms 402a, 402b, 402c to generate the waveform 427 in order to approximate the triangular waveform 420.

5. VEHICLE CONTROL OVERVIEW

In some embodiments a vehicle is controlled at least in part based on data received from a hi-res Doppler LIDAR system mounted on the vehicle.

Figure 5:
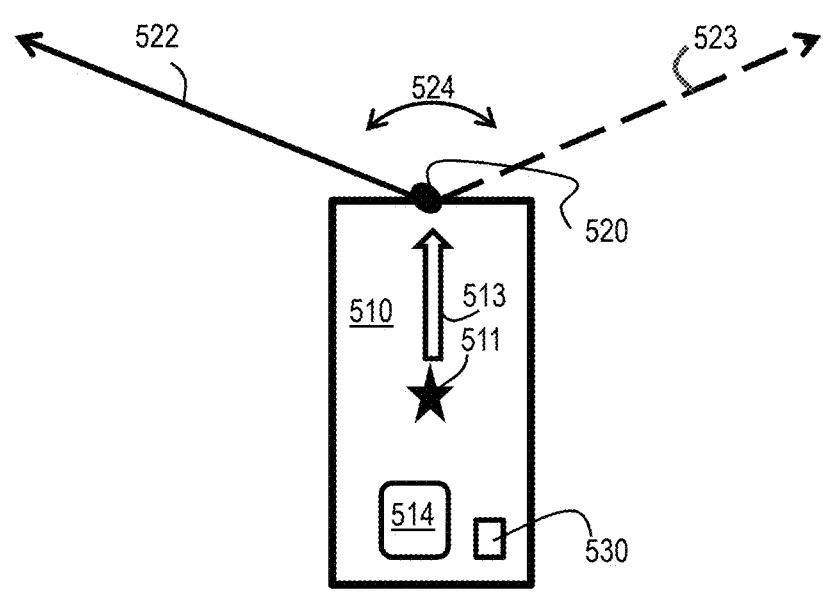
FIG. 5 is a block diagram that illustrates an example system that includes at least one hi-res LIDAR system mounted on a vehicle, according to an embodiment.

FIG. 5 is a block diagram that illustrates an example system 501 that includes at least one hi-res Doppler LIDAR system 520 mounted on a vehicle 510, according to an embodiment. In an embodiment, the LIDAR system 520 is similar to one of the LIDAR systems 200. The vehicle has a center of mass indicted by a star 511 and travels in a forward direction given by arrow 513. In some embodiments, the vehicle 510 includes a component, such as a steering or braking system (not shown), operated in response to a signal from a processor, such as the vehicle control module 272 of the processing system 250. In some embodiments the vehicle has an on-board processor 514, such as chip set depicted in FIG. 8. In some embodiments, the on board processor 514 is in wired or wireless communication with a remote processor, as depicted in FIG. 7. In an embodiment, the processing system 250 of the LIDAR system is communicatively coupled with the on-board processor 514 or the processing system 250 of the LIDAR is used to perform the operations of the on board processor 514 so that the vehicle control module 272 causes the processing system 250 to transmit one or more signals to the steering or braking system of the vehicle to control the direction and speed of the vehicle. The hi-res Doppler LIDAR uses a scanning beam 522 that sweeps from one side to another side, represented by future beam 523, through an azimuthal field of view 524, as well as through vertical angles illuminating spots in the surroundings of vehicle 510. In some embodiments, the field of view is 360 degrees of azimuth. In some embodiments the scanning optics 218 including the oscillatory scan element 302 can be used to scan the beam through the azimuthal field of view 524 or through vertical angles. In an embodiment, inclination angle field of view is from about +10 degrees to about-10 degrees or a subset thereof. In an example embodiment, the maximum design range over the field of view 524 is about 200 meters or in a range from about 150 meters to about 300 meters.

In some embodiments, the vehicle includes ancillary sensors (not shown), such as a GPS sensor, odometer, tachometer, temperature sensor, vacuum sensor, electrical voltage or current sensors, among others well known in the art. In some embodiments, a gyroscope 330 is included to provide rotation information.

6. METHOD FOR OPTIMIZATION OF SCAN PATTERN IN COHERENT LIDAR SYSTEM

Figure 6:
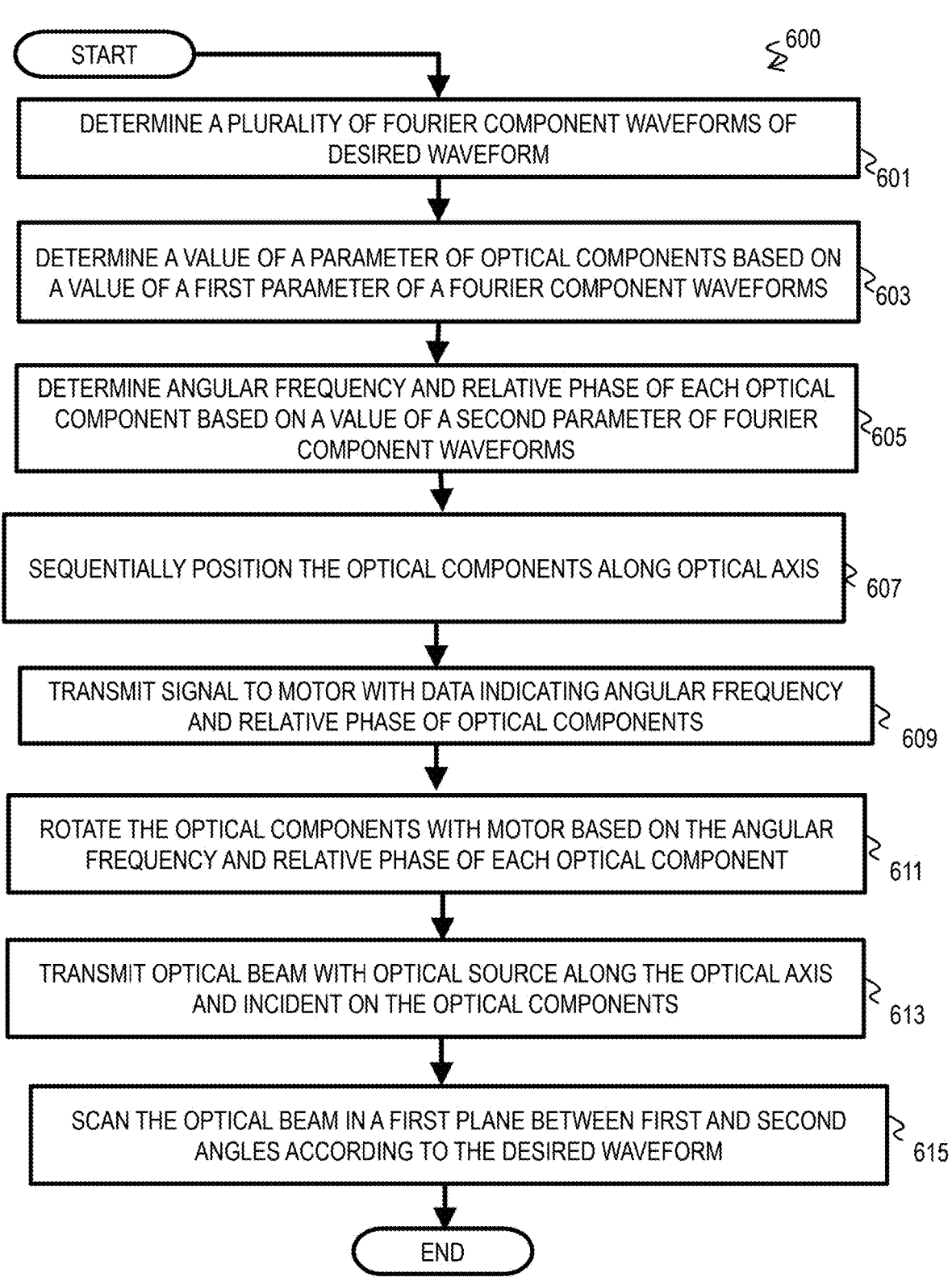
FIG. 6 is a flow chart that illustrates an example method for optimizing a scan pattern of a beam in a first plane between a first angle and a second angle according to a desired waveform, according to an embodiment.

FIG. 6 is a flow chart that illustrates an example method 600 for optimizing a scan pattern of a LIDAR system. In an embodiment, the method 600 is for optimizing a scan pattern of a beam in a first direction between a first angle and a second angle based on a desired (e.g., particular) waveform with a linear slope. In some embodiments, the method 600 is for optimizing the scan pattern of a LIDAR system mounted on an autonomous vehicle. Although steps are depicted in FIG. 6 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 601, a plurality of Fourier component waveforms for a desired waveform are determined. In an embodiment, the desired (e.g., particular) waveform is a waveform with a linear slope, e.g. the triangular waveform 420 of FIG. 4E. In one embodiment, the Fourier component waveforms in step 601 are the odd series harmonics of a Fourier series decomposition of the triangular waveform 420, as appreciated by one of ordinary skill in the art. In other embodiments, waveforms with linear slopes other than triangular waveforms are used. In one embodiment, a Fourier series of a triangular waveform with a unitary amplitude, range [1, −1] and period of 2T is defined by:

$$f = \frac{8}{\pi^2} \sum_{i=1,3,5\,\ldots}^{\infty} \frac{(1)^{i-1/2}}{i^2} \sin\frac{i\pi t}{T} \tag{7a}$$

In one embodiment, for a desired triangular waveform 420 that generates a steered beam 408', this Fourier series can be rewritten as:

$$A_j|_x(t) = \frac{4B}{\pi^2} \sum_{i=1,3,5\,\ldots}^{\infty} \frac{(1)^{i-1/2}}{i^2} \sin\frac{if\pi t}{2} \tag{7b}$$

where B is a cone angle defined by the cone shaped surface 424 or double the angle 406 in the x-z plane, e.g. plane defined by the axes 414, 417; f is the frequency of rotation of the Risley prism 402 and steered beam 408' about the axis 417 (in units of Hertz, Hz); $A_{jx}$ is the projection of the steering angle 406 along the x axis 414 based on rotation of the $j^{th}$ Risley prism where j is A for the first Risley prism 402a, j is B for the second Risley prism 402b, and j is C for the third Risley prism 402c; and the index i is 1 for the first term of equation 7b or $A_{Ax}$, i is 3 for the second term of equation 7b or $A_{Bx}$ and i is 5 for the third term of equation 7b or $A_{cx}$. In one embodiment, the amplitude $A_j$ of the sinusoid in equation 7b is:

$$A_j = \frac{4B}{\pi^2} \frac{(-1)^{(i-1)/2}}{i^2} \tag{7c}$$

and is calculated for each Risley prism in the apparatus. In one embodiment, where three Risley prisms are used in the apparatus, $A_A$ is the angle 406a of the swept beam 408' based on the first Risley prism 402a and is the amplitude of the sinusoid of the first term of equation 7b or equation 7c where j=A, i=1. Similarly, $A_B$ is the angle 406b of the swept beam 408' based on the second Risley prism 402b and is the amplitude of the sinusoid of the second term of equation 7b or equation 7c where j=B and i=3. Similarly, $A_C$ is the angle 406c of the swept beam 408' based on the third Risley prism 402c and is the amplitude of the sinusoid of the third term of equation 7b or equation 7c where j=C and i=5.

Additionally, in an embodiment, the frequency of the sinusoid (if) in equation 7b is used to calculate the angular frequency ω for each Risley prism. In an embodiment, the angular frequency ω of each Risley prism is:

$$\omega = 2\pi(if) \tag{7d}$$

where i=1 for the first Risley prism 402a, i=3 for the second Risley prism 402b and i=5 for the third Risley prism 402c.

In an embodiment, the first term of equation 7b (e.g. j=A, i=1) represents the sinusoid curve 415a or the projection of the steering angle 406a along the axis 414 based on rotation of the first Risley prism 402a. In this embodiment, the amplitude of the sinusoid curve 415a is based on the above amplitude of the sinusoid of equation 7b for the first term, e.g. equation 7c where j=A and i=1. Also, in this embodiment, the angular frequency of the sinusoid curve 415a is based on the above angular frequency of 2πf, e.g. equation 7d where i=1. In an embodiment, the second term of equation 7b (e.g. j=B, i=3) represents the sinusoid curve 415b or the projection of the steering angle 406b along the axis 414 based on rotation of the second Risley prism 402b. In this embodiment, the amplitude of the sinusoid curve 415b is based on the above amplitude of the sinusoid of equation 7b for the second term, e.g. equation 7c where j-B and i=3. Also, in this embodiment, the angular frequency of the sinusoid curve 415b is based on the above angular frequency of 6πf, e.g. equation 7d where i=3. In an embodiment, the third term of equation 7b (e.g. j=C, i=5) represents the sinusoid curve 415c or the projection of the steering angle 406c along the axis 414 based on the rotation of the third Risley lens 402c. In this embodiment, the amplitude of the sinusoid curve 415c is based on the above amplitude of the sinusoid of equation 7b for the third term, e.g. equation 7c where j-C, i=5. Also, in this embodiment, the angular frequency of the sinusoid curve 415c is based on the above angular frequency of 10πf, e.g. equation 7d where i=5. In an embodiment, only those Fourier component waveforms of equation 7b that correspond to the number of optical components are used in step 601 (e.g. first three Fourier component waveforms are used for the three Risley prisms 402a, 402b, 402c). As previously discussed, more or less than three optical components may be used in step 601.

In step 603, a value of a parameter of the optical components are determined based on a value of a first parameter of the Fourier component waveforms in step 601. In an embodiment, the parameter of the Risley prisms 402 is one or more of the prism angle or cut angle 407, the index of refraction n, a diameter 405, the thickness 432 and/or the steering angle 406. In another embodiment, the first parameter of the Fourier component waveform in step 601 is an amplitude $A_j$ (e.g. using equation 7c) and/or frequency or angular frequency ω (e.g. using equation 7d).

In one embodiment, in step 603 the steering angle 406 is calculated for each Risley prism 402. In an example embodiment, for a desired triangular waveform 420 that achieves a steered beam 408' with a cone angle B of about 10 degrees and a frequency f of about 30 Hz, equations 7b-7d are used herein to calculate the steering angles 406a, 406b, 406c for each Risley prism 402a, 402b, 402c, respectively represented by $A_A$, $A_B$, $A_C$. In an embodiment, the steering angle of each respective Risley prism indicates the steering angle of the beam 408' if only that Risley prism was used to steer the beam 408'. In an embodiment, these three angles are calculated to be about 0.8106 A, 0.0901 A and 0.0324 A, where A is the desired steering angle of the steered beam 408' (e.g. half the cone angle B or 5 degrees in this example) by all of the Risley prisms. In this example embodiment, the three steering angles of the three Risley prisms 402a, 402b, 402c are calculated to be about 4.05, 0.451 and 0.162 degrees, respectively.

In another embodiment, in step 603 the cut angle 407 for each Risley prism 402 is calculated based on the calculated steering angle 406a, 406b, 406c and/or the amplitude of equation 7c and/or the angular frequency of equation 7d. In the above example embodiment, where the steering angles 406a, 406b, 406c for the three Risley prisms 402a, 402b, 402c are calculated to be about 4.05, 0.451 and 0.162 degrees, the cut angle 407 of the three prisms is respectively calculated at about 11.75, 1.318 and 0.473 degrees, respectively. In an embodiment, one or more equations to calculate the cut angle 407 based on the steering angle 406 is found in Appendix A.

Additionally, in an embodiment, in step 603 the diameter 405 is determined based on one or more parameters of the incident beam 408. In an example embodiment, the diameter 405 is greater than and/or about 150% a diameter of the incident beam 408 (e.g. fundamental transverse mode Gaussian beam or 00 TEM). In one example embodiment, where the diameter of the incident beam 408 is about 8 millimeters (mm) or in a range from about 6 mm to about 10 mm, the diameter 405 is about 12 millimeters or in a range from about 9 mm to about 15 mm. In some embodiments, the index of refraction is for standard crown glass (e.g. n=1.52). Additionally, in step 603, in one example embodiment, the thickness 432 is calculated based on:

$$T = d * \tan\alpha \tag{7e}$$

Where T is the thickness 432; d is the diameter 405; and a is the cut angle 407. In an embodiment, using equation 7e, the thickness 432 for the three respective Risley prisms 402a, 402b, 402c is calculated at about 3 mm, 0.4 mm and 0.15 mm, respectively. In one example embodiment, the latter two thicknesses for the Risley prisms 402b, 402c are increased to a minimum thickness to promote manufacturability and durability. In view of the calculated parameters of the Risley prisms 402a, 402b, 402c, the assembly can be made extremely compact.

In step 605, a value of an angular frequency and/or relative phase of the optical components are determined based on a value of a second parameter of the Fourier component waveforms in step 601. In another embodiment, the second parameter of the Fourier component waveform is the angular frequency ω and/or sign of the waveform for t>0. Additionally, in this example embodiment, using equation 7d and f=30 Hz, the angular frequencies for the Risley prisms 402a, 402b, 402c is calculated at about 1800 rpm, 5400 rpm and 9000 rpm, respectively. In one embodiment, the (−1) parameter of equation 7b affects the sign of each Fourier component waveform and thus the relative phase of each Fourier component waveform (e.g. opposite signs indicate out of phase). In one embodiment, the angular frequency of the first Risley prism 402a is selected based on the angular frequency $\omega_a$ of the first Fourier component waveform of equation 7b or equation 7d where i=1. In one embodiment, the angular frequency of the second Risley prism 402b is selected based on the angular frequency 30a (i=3) of the second Fourier component waveform of equation 7b or equation 7d where i=3. In one embodiment, the angular frequency of the third Risley prism 402c is selected based on the angular frequency 50a (i=5) of the third Fourier component waveform of equation 7b or equation 7d where i=5. Thus, in one embodiment, the angular frequency of the third Risley prism 402c is about 5 times the angular frequency of the first Risley prism 402a and the angular frequency of the second Risley prism 402b is about three times the angular frequency of the first Risley prism 402a. In an embodiment, in step 605 the relative phase of the optical components is determined based on a relative phase between the first three Fourier component waveforms of equation 7b, as depicted by the curves 415a, 415b, 415c in FIG. 4N.

In step 607, the optical components whose parameters were determined in steps 601 and 603 are obtained and sequentially positioned along an optical axis. In an embodiment, the three Risley prisms 402a, 402b, 402c are sequentially arranged along the optical axis 417. In one embodiment, the three Risley prisms 402a, 402b, 402c are sequentially arranged along the optical axis 417 so that the angled faces 409 of adjacent Risley prisms are within a threshold distance (e.g. about 1 centimeter, cm) of each other. In an embodiment, the Risley prisms 402a, 402b, 402c are sequentially positioned so that a longitudinal axis (defined by the non-angled face 411) of each prism 402a, 402b, 402c is about orthogonal to the axis 417. In an embodiment, the Risley prisms 402a, 402b, 402c are positioned so that the non-angled face 411 is oriented in the direction from which the incident beam 408 is transmitted toward the Risley prisms 402a, 402b, 402c.

In step 609, a signal is transmitted to the motor 306 where the signal includes data indicating the angular frequency and relative phase of each of the optical components, based on the angular frequency and relative phase of each optical component determined in step 605. In an embodiment, in step 609, the signal includes data indicating the angular frequency $\omega_a$ for the first Risley prism 402a; angular frequency 30a for the second Risley prism 402b; and angular frequency 50a for the third Risley prism 402c. Additionally, in an embodiment, in step 609 the signal includes data indicating the relative phase between the three Risley prisms 402a, 402b, 402c based on the relative phases between the three Fourier component waveforms of equation 7b. In an example embodiment, the signal data indicates that the three Risley prisms 402a, 402b, 402c are in phase at certain time periods consistent with the three waveforms 415a, 415b, 415c being in phase at certain time periods, e.g. when they have common peaks or common valleys, as shown in FIG. 4N.

In step 611, the motor 306 rotates the plurality of optical components based on the signal received by the motor 306 in step 609. In an embodiment, in step 611, the motor 306 rotates the three Risley prisms 402a, 402b, 402c based on the angular frequencies and relative phase received in the signal in step 609.

In step 613, the beam 408 is transmitted by an optical source (e.g. source 212) along the optical axis 417 and incident on the plurality of optical components. In an example embodiment, in step 613, the beam 408 is transmitted by the optical source 212 and incident along the axis 417 on the plurality of Risley prisms 402a, 402b, 402b that are rotating based on step 611.

In step 615, the beam 408 is steered or scanned in a first plane between first and second angles according to the desired waveform. In an embodiment, the beam 408 is steered into a steered beam 408″ by the plurality of Risley prisms 402a, 402b, 402c in a first plane (e.g. plane defined by axes 414, 417) between first and second angles according to the waveform 427 which approximates the triangular waveform 420. In a further embodiment, in step 615 the plurality of Risley prisms 402a, 402b, 402c repeatedly scan the beam 408″ between first and second angles in the first plane (e.g. between angles −A and +A along axis 222 of FIG. 2B). In another embodiment, in step 615 the unidirectional scan element 304 (e.g. polygon scanner).

FIG. 6B is a flow chart that illustrates an example method 600 for refractive beam steering in a LIDAR system, according to an embodiment. Although steps are depicted in FIG. 6B as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways. In some embodiment, some or all operations of method 400b may be performed by any of the systems (e.g., LIDAR system 200 in FIG. 2 and/or one or more components (e.g., processing system 250 in FIG. 2, Risley Prism 402 in FIG. 4A) that are described herein.

The method 600b includes the operation 602b of receiving a beam transmitted along an optical axis. The method 600b includes the operation 604b of generating, based on one or more components of a desired waveform, a first scan pattern and a second scan pattern. The method 600b includes the operation 606b of projecting, based on the first scan pattern, the beam as a plurality of scan lines in a first plane. The method 600b includes the operation 608b of receiving the plurality of scan lines projected in the first plane. The method 600b includes the operation 610b of projecting, based on the second scan pattern, the plurality of scan lines as a second plurality of scan lines in a second plane. In some embodiments, the first plane is orthogonal to the second plane.

7. COMPUTATIONAL HARDWARE OVERVIEW

Figure 7:
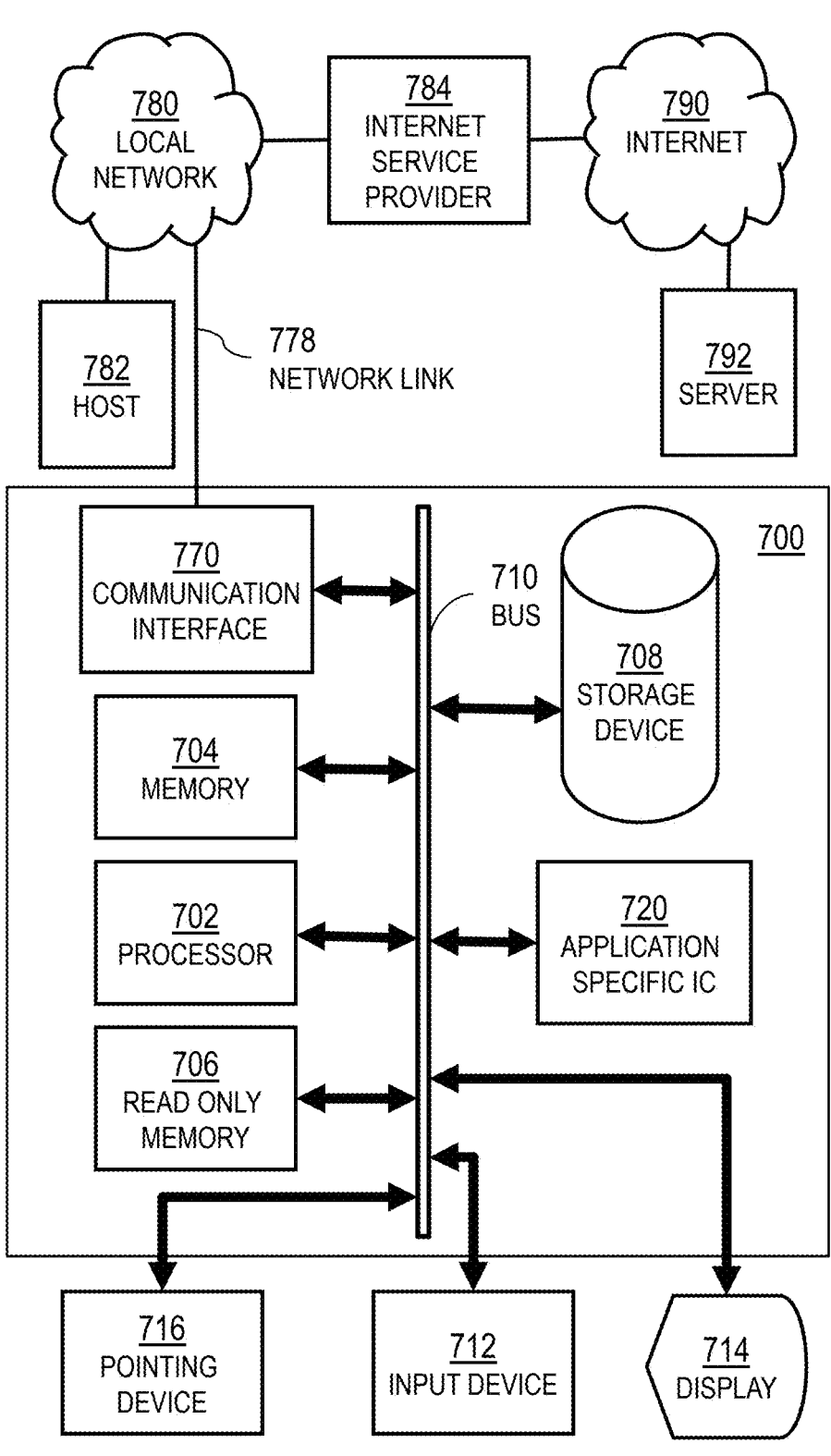
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of one or more methods described herein.

A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, that carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 702, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 702, except for carrier waves and other signals.

Logic encoded in one or more tangible media includes one or both of processor instructions on a computer-readable storage media and special purpose hardware, such as ASIC 720.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
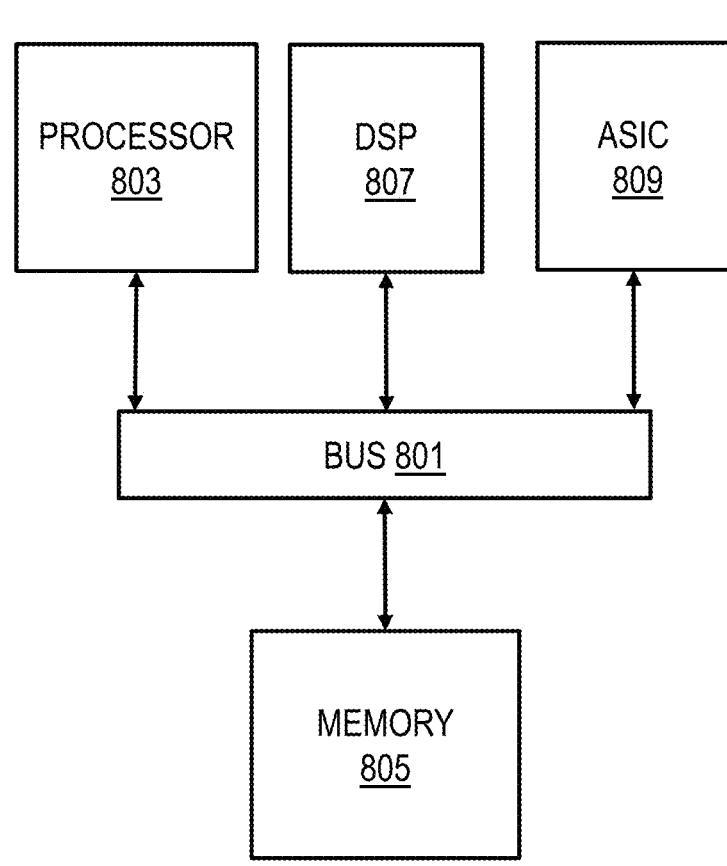
FIG. 8 illustrates a chip set upon which an embodiment of the invention may be implemented.

FIG. 8 illustrates a chip set 800 upon which an embodiment of the invention may be implemented. Chip set 800 is programmed to perform one or more steps of a method described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of a method described herein.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 805 also stores the data associated with or generated by the execution of one or more steps of the methods described herein.

8. ALTERATIONS, EXTENSIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of a hi-res LIDAR system. One embodiment of the invention is described in the context of optimization of scanning a beam by an oscillatory scan element of a LIDAR system. Other embodiments of the invention are described in the context of single front mounted hi-res Doppler LIDAR system on a personal automobile; but, embodiments are not limited to this context. In other embodiments, one or multiple systems of the same type or other high resolution LIDAR, with or without Doppler components, with overlapping or non-overlapping fields of view or one or more such systems mounted on smaller or larger land, sea or air vehicles, piloted or autonomous, are employed.

What is claimed is:

1. A light detection and ranging (LIDAR) system comprising:
a scanner that receives a beam and projects the beam;
a motor that is coupled to the scanner; and
one or more processors that are configured to:
receive an input waveform;
control, based on one or more component waveforms for the input waveform, the motor to rotate the scanner.

2. The LIDAR system as recited in claim 1, wherein the one or more processors are configured to control the motor to rotate the scanner by generating a signal based on one or more component waveforms for the input waveform, and transmitting the signal to the motor, causing the motor to rotate the scanner.

3. The LIDAR system as recited in claim 1, wherein the input waveform is a triangular waveform or a sawtooth waveform.

4. The LIDAR system as recited in claim 1, wherein the rotation of the scanner causes the scanner to project the beam as a plurality of scan lines having even spacing.

5. The LIDAR system as recited in claim 4, further comprising:
a receiver that is configured to receive a returned signal responsive to the scanner projecting the beam as a plurality of scan lines;
wherein the one or more processors are further configured to operate a vehicle based on the returned signal.

6. The LIDAR system as recited in claim 4, wherein the one or more processors are further configured to:
determine one or more parameters associated with the scanner; and
generate a signal based on the one or more parameters and the one or more component waveforms; and control, based on the signal, the motor to rotate the scanner.

7. The LIDAR system as recited in claim 6, wherein the one or more parameters comprises at least one of a prism angle associated with the scanner, an index of refraction associated with the scanner, or a diameter of the scanner.

8. The LIDAR system as recited in claim 1, wherein the one or more component waveforms of the input waveform comprise one or more Fourier component waveforms of the input waveform.

9. The LIDAR system as recited in claim 8, wherein a first Fourier component waveform of the one or more Fourier component waveforms has an amplitude that is greater than an amplitude of a second Fourier component waveform of the one or more Fourier component waveforms.

10. The LIDAR system as recited in claim 9, wherein the first Fourier component waveform has a frequency that is less than a frequency of the second Fourier component waveform.

11. The LIDAR system as recited in claim 1, wherein
the one or more processors are configured to generate a signal based on the one or more component waveforms for the input waveform, and
the signal comprises data indicating at least one of an angular frequency, a frequency, a phase, or an amplitude.

12. The LIDAR system as recited in claim 1, wherein
the rotation of the scanner causes the scanner to project the beam as a plurality of scan lines in a first plane between a first angle and second angle, and
the LIDAR system further comprises:
a second scanner that receives, from the scanner, the plurality of scan lines projected in the first plane, and projects the plurality of scan lines as a second plurality of scan lines in a second plane between a third angle and a fourth angle.

13. The LIDAR system as recited in claim 12, wherein a difference between the third angle and the fourth angle is smaller than a difference between the first angle and the second angle.

14. The LIDAR system as recited in claim 12, wherein
the one or more processors are configured to generate a signal based on the one or more component waveforms for the input waveform, and
the signal causes the motor to rotate the second scanner.

15. The LIDAR system as recited in claim 14, wherein the second scanner includes a polygon scanner.

16. The LIDAR system as recited in claim 14, wherein the scanner controls actuation of a beam along a first axis and the second scanner controls actuation of the beam along a second axis.

17. The LIDAR system as recited in claim 1, wherein the scanner comprises one or more Risley prisms.

18. A method for controlling a scanner of a light detection and ranging (LIDAR) system, the method comprising:
receiving, by a processing circuit of the LIDAR system, an input waveform;
controlling, by the processing circuit based on one or more component waveforms for the input waveform, a motor to rotate a scanner.

19. The method of claim 18, wherein the rotation of the scanner causes the scanner to project a beam as a plurality of scan lines having even spacing and further comprising:
receiving a returned signal responsive to the scanner projecting the beam as a plurality of scan lines; and
operating a vehicle based on the returned signal.

20. An autonomous vehicle control system comprising:

a scanner that receives a beam and projects the beam;

a motor that is coupled to the scanner; and one or more processors that are configured to:

receive an input waveform;

control, based on one or more component waveforms for the input waveform, the motor to rotate the scanner, wherein the rotation of the scanner causes the scanner to project the beam as a plurality of scan lines;

receive a plurality of electrical signals responsive to the scanner projecting the beam as the plurality of scan lines; and control operation of an autonomous vehicle using the plurality of electrical signals.

\*　\*　\*　\*　\*